(12) United States Patent
Kim

(10) Patent No.: US 11,035,790 B2
(45) Date of Patent: Jun. 15, 2021

(54) INSPECTION APPARATUS AND INSPECTION METHOD

(71) Applicant: Industrial Cooperation Foundation Chonbuk National University, Jeonju-si (KR)

(72) Inventor: Daesuk Kim, Jeonju-si (KR)

(73) Assignee: Industrial Cooperation Foundation Chonbuk National University, Jeollabuk-do (KR)

( * ) Notice: Subject to any disclaimer, the term of this patent is extended or adjusted under 35 U.S.C. 154(b) by 0 days.

(21) Appl. No.: 16/679,674

(22) Filed: Nov. 11, 2019

(65) Prior Publication Data

US 2020/0209155 A1    Jul. 2, 2020

(30) Foreign Application Priority Data

Dec. 31, 2018  (KR) .................... 10-2018-0173269
Oct. 1, 2019   (KR) .................... 10-2019-0121610

(51) Int. Cl.
   *G01N 21/45*   (2006.01)
   *G01N 21/21*   (2006.01)

(52) U.S. Cl.
   CPC ........... *G01N 21/45* (2013.01); *G01N 21/211* (2013.01); *G01N 2021/213* (2013.01)

(58) Field of Classification Search
   None
   See application file for complete search history.

(56) References Cited

U.S. PATENT DOCUMENTS 9,267,879 B2   2/2016  Ko et al.
9,488,568 B2   11/2016 Sugita et al.
(Continued)

FOREIGN PATENT DOCUMENTS

EP          3413022 A1    12/2018
KR   10-2009-0054017 A    5/2009
(Continued)

OTHER PUBLICATIONS

Daesuk Kim, et al., "Robust snapshot interferometric spectropolarimetry", Optics Letters, vol. 41, No. 10, May 15, 2016.
(Continued)

*Primary Examiner* — Shawn Decenzo
(74) *Attorney, Agent, or Firm* — Harness, Dickey & Pierce, P.L.C.

(57) ABSTRACT

The present inventive concepts comprises linearly polarizing light, splitting the linearly polarized light into a first light and a second light, modulating the first light and the second light to have a phase difference to produce an output wave light, converting the output wave light to have a linear shape in a first direction to radiate the converted output wave light to a measured object, receiving a measurement light coming out of the measured object and linearly polarizing the first light and the second light of the measurement light to generate an interference light, and obtaining from the interference light an image of the measured object. The measured object can be scanned in a second direction intersecting the first direction or may be scanned rotationally about an axis in a third direction perpendicular to the first and second directions.

17 Claims, 14 Drawing Sheets

(56) References Cited

U.S. PATENT DOCUMENTS

| | | |
|---|---|---|
| 9,823,075 B2 | 11/2017 | Yao |
| 10,132,686 B1* | 11/2018 | Kim .................. G01J 3/4531 |
| 2009/0161943 A1 | 6/2009 | Yamashita et al. |
| 2009/0174883 A1* | 7/2009 | Zawaideh .......... G01B 11/0641 356/369 |
| 2010/0245819 A1* | 9/2010 | Li .................. G01B 11/0641 356/327 |
| 2013/0114085 A1* | 5/2013 | Wang .................. G01N 21/55 356/445 |
| 2014/0233024 A1* | 8/2014 | Taniguchi .......... G01N 21/9501 356/237.5 |
| 2014/0354991 A1 | 12/2014 | Li et al. |
| 2015/0012246 A1* | 1/2015 | Kim .................. G01B 11/06 702/172 |
| 2015/0106057 A1* | 4/2015 | Sugita .................. G01J 3/2823 702/167 |
| 2015/0153165 A1* | 6/2015 | Liu .................. G01B 11/245 356/369 |
| 2015/0168291 A1* | 6/2015 | Sugita .................. G01N 21/211 356/327 |
| 2015/0276623 A1* | 10/2015 | Urano .................. G01N 21/956 356/369 |
| 2018/0073993 A1 | 3/2018 | Zhao et al. |
| 2019/0049302 A1* | 2/2019 | Kim .................. G01J 3/0224 |
| 2020/0049557 A1* | 2/2020 | Kim .................. G01J 4/04 |
| 2020/0166563 A1* | 5/2020 | Lim .................. G01N 21/211 |
| 2020/0225151 A1* | 7/2020 | Wang .................. G01J 3/2823 |

FOREIGN PATENT DOCUMENTS

| | | |
|---|---|---|
| KR | 101005179 B1 | 1/2011 |
| KR | 101400757 B1 | 5/2014 |
| KR | 10-2015-0069516 A | 6/2015 |
| KR | 20160097576 A | 8/2016 |
| KR | 10-2017-0031642 A | 3/2017 |
| KR | 101812608 B1 | 12/2017 |
| WO | WO-2017/135641 A | 8/2017 |
| WO | WO-2017135641 A1 * | 8/2017 ............ G01J 3/4531 |

OTHER PUBLICATIONS

M. G. Moharam, et al., "Stable implementation of the rigorous coupled-waveanalysis for surface-relief gratings: enhanced transmittance matrix approach", The Optical Society, vol. 12, No. 5, May 1995.

Daesuk Kim, et al., "Calibration of a snapshot phase-resolved polarization-sensitive spectral reflectometer", Optics Letters, vol. 38, No. 22, Nov. 15, 2013.

Mitsuo Takeda, et al., "Fourier-transform method of fringepattern analysis for computer-based topography and interferometry", Journal of the Optical Society of America, vol. 72, No. 1, Jan. 1982.

Extended European Search Report dated May 6, 2020, issued in corresponding European Patent Application No. 19208902.7.

* cited by examiner

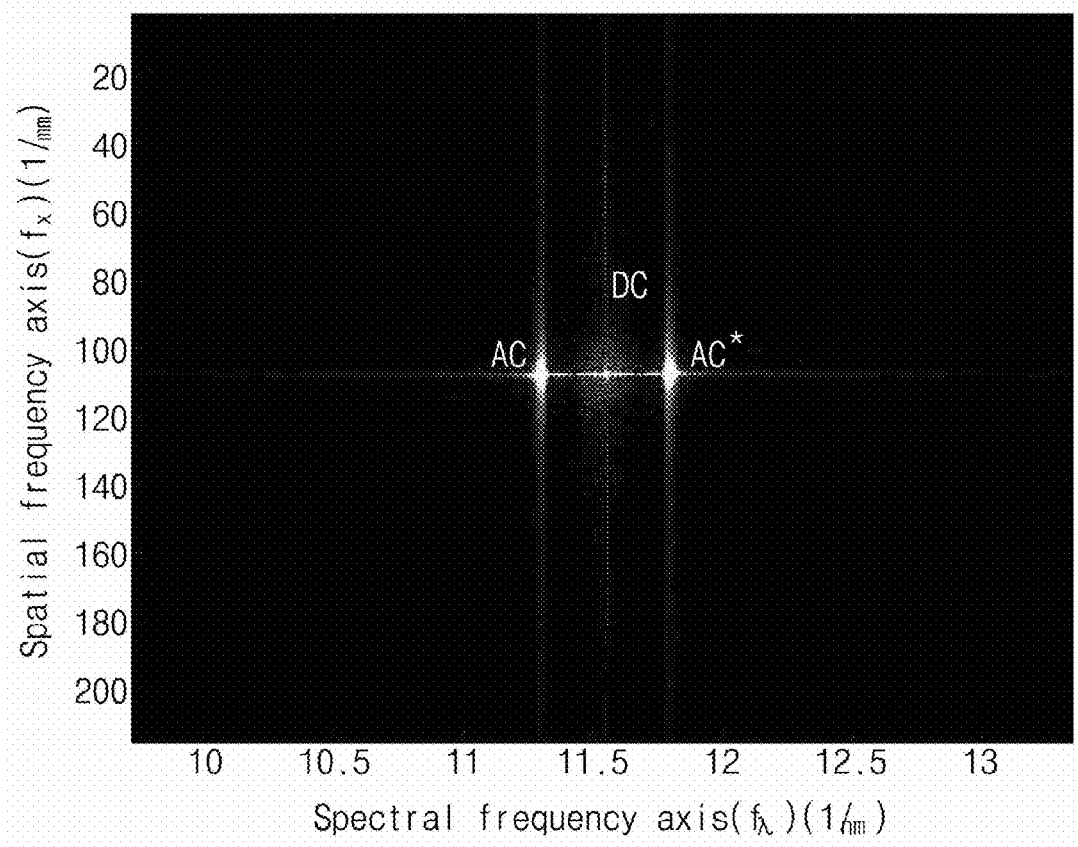

INSPECTION APPARATUS AND INSPECTION METHOD

CROSS-REFERENCE TO RELATED APPLICATION

This U.S. nonprovisional application claims priority under 35 U.S.C § 119 to Korean Patent Application Nos. 10-2018-0173269 filed on Dec. 31, 2018 and 10-2019-0121610 filed on Oct. 1, 2019 in the Korean Intellectual Property Office, the entire contents of which are hereby incorporated by reference.

BACKGROUND

The present inventive concepts relate to an inspection apparatus and an inspection method, and more particularly, to an inspection apparatus and an inspection method that measure an image of a measured object.

Imaging technology has been widely used to investigate and study physical phenomena changed in real-time, and may be applied to various diagnosis and inspection tools. Polarization-based imaging technology is one of high resolution and high precision measurement techniques applicable to diverse fields.

Most of polarization measurement techniques require either mechanically rotational polarizer mechanism or electronic polarization modulation device. However, the polarization measurement technique which employs mechanical mechanism or electronic polarization modulation has a disadvantage of complex hardware configuration and long measurement time.

SUMMARY

Some example embodiments of the present inventive concepts provide an inspection apparatus and an inspection method that are capable of measuring an image at high speed.

According to some example embodiments of the present inventive concepts, an inspection apparatus may comprise: a light generator that generates light; a first linear polarizer that linearly polarizes the light; a polarization interferometer that splits the linearly polarized light into a first light and a second light and that modulates the first light and the second light to have phase difference information; a line converter that converts an output wave light to have a linear line-shape in a first direction and that provides a measured object with the line-shaped output wave light, the output wave light coming out of the polarization interferometer; a scanner that loads the measured object, the scanner being configured such that the measured object is scanned in a second direction intersecting the first direction or is scanned rotationally about an axis in a third direction perpendicular to the first and second directions; a second linear polarizer that receives a measurement light and linearly polarizes the first light and the second light of the measurement light to generate an interference light, the measurement light coming from the output wave light that passes through or reflects from the measured object; and an imaging spectrograph that receives the interference light to obtain an image of the measured object.

In certain embodiments, the line converter may be a cylindrical lens elongated in the first direction.

In certain embodiments, the inspection apparatus may further comprise an imaging lens that converts the interference light to have a linear line-shape in the first direction and that provides the imaging spectrograph with the line-shaped interference light.

In certain embodiments, the first direction and the second direction may be perpendicular to each other.

In certain embodiments, the polarization interferometer may include: a polarizing splitter that splits the linearly polarized light into the first light and the second light, the polarizing splitter including an incident surface on which the linearly polarized light is incident, a first reflective surface on which the first light is incident, and a second reflective surface on which the second light is incident, wherein the first reflective surface faces the incident surface, and wherein the first and second reflective surfaces are adjacent to each other; a first mirror on the first reflective surface; and a second mirror on the second reflective surface.

In certain embodiments, a length of an optical path along which the first light reciprocally travels between the first reflective surface and the first mirror may be different from a length of an optical path along which the second light reciprocally travels between the second reflective surface and the second mirror. A difference in the optical path between the first light and the second light may be 10 μm to 100 μm.

In certain embodiments, the first mirror and the second mirror may have an angle deviated from perpendicular. The deviation angle may range from 0.02° to 0.1°.

In certain embodiments, the output wave light may be irradiated at a measurement angle deviated from a direction perpendicular to the measured object, and the measurement light may be reflected at the measurement angle deviated from the direction perpendicular to the measured object. A propagation direction of the output wave light, a propagation direction of the measurement light, and the second direction may be provided on the same plane.

In certain embodiments, the polarizing splitter may be a non-polarizing beam splitter, and the polarization interferometer may further include: a first sub-linear polarizer between the first reflective surface and the first mirror of the polarizing splitter; and a second sub-linear polarizer between the second reflective surface and the second mirror of the polarizing splitter, wherein the first sub-linear polarizer and the second sub-linear polarizer have a polarization difference of as much as 90°. The line converter may be disposed between the polarization interferometer and the measured object.

In certain embodiments, the polarizing splitter may be a polarizing beam splitter, and the inspection apparatus may further comprise a non-polarizing beam splitter between the first linear polarizer and the polarization interferometer, the non-polarizing beam splitter providing the polarization interferometer with the linearly polarized light and providing the measured object with the output wave light. The line converter may be disposed between the non-polarizing beam splitter and the measured object.

In certain embodiments, the output wave light may be vertically incident on the measured object, and the measurement light may be vertically reflected from the measured object.

In certain embodiments, the inspection apparatus may further comprise a non-polarizing beam splitter that is adjacent to the polarization interferometer and provides the measured object with the output wave light. The line converter may be disposed between the polarization interferometer and the non-polarizing beam splitter. The output wave light may be provided through the line converter and the non-polarizing beam splitter to the measured object, and the measurement light may be provided through the non-polarizing beam splitter to the second linear polarizer.

In certain embodiments, the interference light may be vertically incident on the imaging spectrograph.

In certain embodiments, the light generated from the light generator may be a white light.

In certain embodiments, the first light and the second light may be a P-polarization wave and an S-polarization wave, respectively.

According to some example embodiments of the present inventive concepts, an inspection method may comprise: linearly polarizing light; splitting the linearly polarized light into a first light and a second light; modulating the first light and the second light to have a phase difference to produce an output wave light; converting the output wave light to have a linear line-shape in a first direction to radiate the converted output wave light to a measured object; receiving a measurement light coming out of the measured object and linearly polarizing the first light and the second light of the measurement light to generate an interference light; and obtaining an image of the measured object from the interference light. The measured object may be scanned in a second direction intersecting the first direction or scanned rotationally about an axis in a third direction perpendicular to the first and second directions.

In certain embodiments, the inspection method may further comprise converting the interference light to have a linear line-shape in the first direction.

In certain embodiments, the light may be a monochromatic light, and a wavelength of the light may be variable.

In certain embodiments, the light may be a white light.

In certain embodiments, the inspection method may further comprise obtaining, from the interference light, spatio-spectral ellipsometric information on an axis of the first direction, an axis of the second direction, and a wavelength axis of the light. The image of the measured object may be extracted from the spatio-spectral ellipsometric information.

In certain embodiments, the first light and the second light may be a P-polarization wave and an S-polarization wave, respectively.

In certain embodiments, the first direction and the second direction are perpendicular to each other.

BRIEF DESCRIPTION OF THE DRAWINGS

FIG. 3 illustrates an example of a spatio-spectral frequency image created by the Fourier transform on the interference fringe image depicted in FIG. 2A.

DETAILED DESCRIPTION OF EMBODIMENTS

The following will now describe preferable embodiments of the present inventive concepts with reference to the accompanying drawings.

In the embodiments that follow, a reflection-based inspection is explained, but the embodiments may also be similarly applied to a transmission-based inspection.

Figure 1:
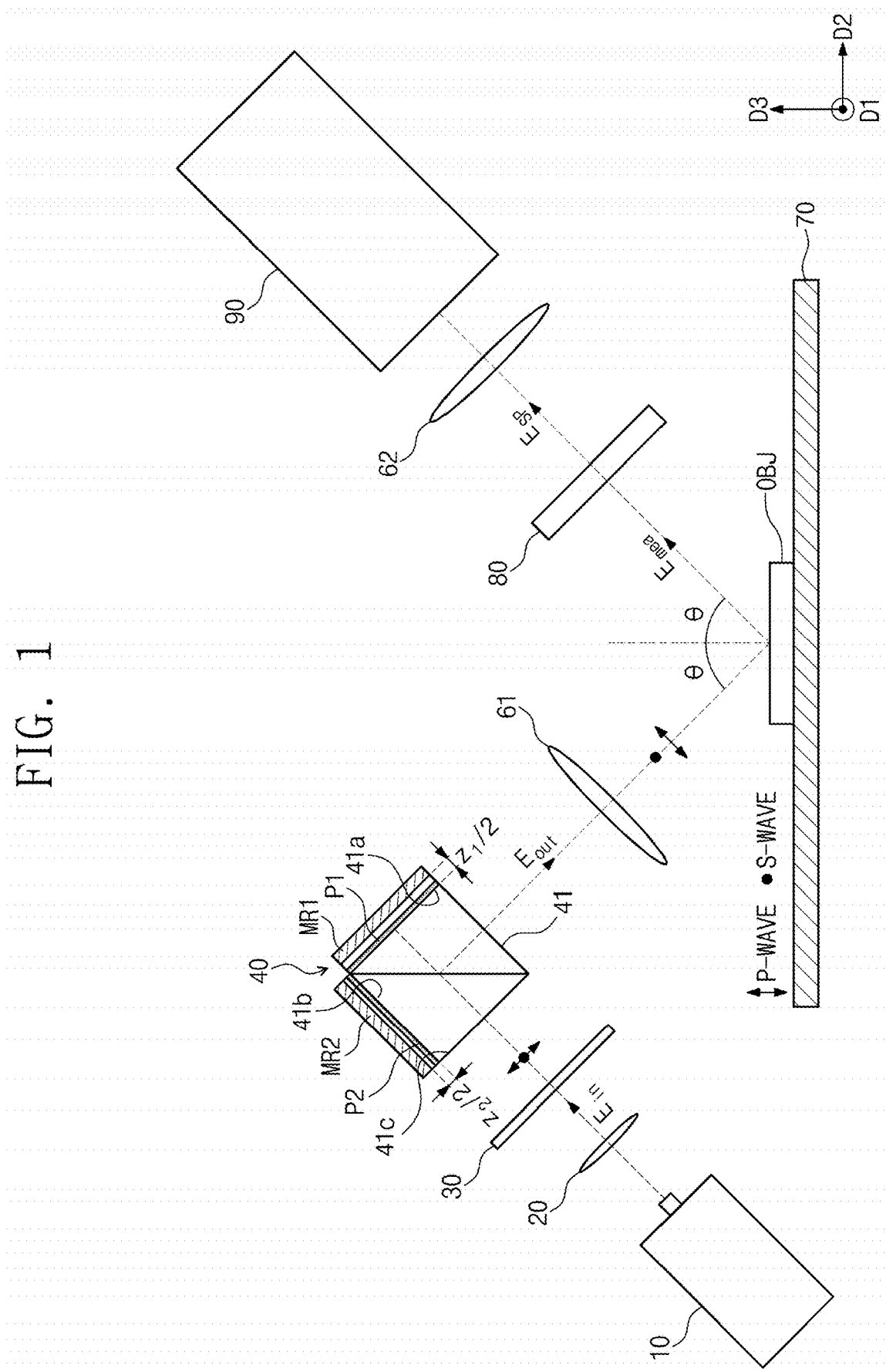
FIG. 1 illustrates a simplified schematic diagram showing an inspection apparatus according to an example of a first embodiment of the present inventive concepts.

FIG. 1 illustrates a simplified schematic diagram showing an inspection apparatus according to an example of a first embodiment of the present inventive concepts. Referring to FIG. 1, an inspection apparatus may include a light generator 10, a collimating lens 20, a first linear polarizer 30, a polarization interferometer 40, a line converter 61, a scanner 70, a second linear polarizer 80, an imaging lens 62, and an imaging spectrograph 90.

The light generator 10 may generate a white light. The light generator 10 may be a white-light source which has a uniform spectral distribution over a wide range of wavelength $\lambda$. The light generator 10 may be, for example, a deuterium lamp or a tungsten-halogen lamp. It is preferable that the white light has a wavelength range of, for example, at least 200 nm wide. The wavelength range of the white light may include one or more of a near-ultraviolet range (e.g., 200 nm to 400 nm), a visible light range (e.g., 400 nm to 700 nm), and a near-infrared range (e.g., 700 nm to 1,700 nm).

The white light may be illuminated to the collimating lens 20. The collimating lens 20 may convert the white light, which travels away from the light generator 10, into a collimated light.

The first linear polarizer 30 may be illuminated with an input wave light Ern from the collimating lens 20. The first linear polarizer 30 may linearly polarize the white light (e.g., with a rotation angle of 45°).

The polarization interferometer 40 may be a one-piece polarization interferometer by which the white light undergoes polarization modulation. The polarization interferometer 40 may include a polarizing splitter 41, a first mirror MR1, and a second mirror MR2, which first and second mirrors MR1 and MR2 are integrally disposed on the polarizing splitter 41.

The polarizing splitter 41 may be a non-polarizing beam splitter and may split the linearly polarized white light into a first light and a second light. The polarizing splitter 41 may have an incident surface 41c on which linearly polarized light is incident, a first reflective surface 41a, and a second reflective surface 41b perpendicularly adjacent to the first reflective surface 41a. A distance between the incident surface 41c and the first reflective surface 41a may be the same as that between the incident surface 41c and the second reflective surface 41b. The first mirror MR1 may be disposed on the first reflective surface 41a, and the second mirror MR2 may be disposed on the second reflective surface 41b.

A first sub-linear polarizer P1 may be disposed between the first reflective surface 41a and the first mirror MR1, and a second sub-linear polarizer P2 may be disposed between the second reflective surface 41b and the second mirror MR2. For example, the first sub-linear polarizer P1 may be a linear polarizer oriented at 0°, and the second sub-linear polarizer P2 may be a linear polarizer oriented at 90°. Therefore, the first light may be linearly polarized into a P-polarization wave, and then the P-polarization wave may be incident on and reflected from the first mirror MR1. The second light may be linearly polarized into an S-polarization wave, and then the S-polarization wave may be incident on and reflected from the second mirror MR2. Alternatively, the first and second sub-linear polarizers P1 and P2 may be differently arranged, and thus the first light and the second light may be an S-polarization wave and a P-polarization wave, respectively. For convenience of description, the first light and the second light are respectively explained below as the P-polarization wave and the S-polarization wave.

A gap $z_1/2$ between the first reflective surface 41a and the first mirror MR1 may be different from a gap $z_2/2$ between the second reflective surface 41b and the second mirror MR2. To achieve this configuration, air may be interposed between the first reflective surface 41a and the first mirror MR1 and between the second reflective surface 41b and the second mirror MR2. The first and second sub-linear polarizers P1 and P2 may have the same thickness. Therefore, the first light and the second light may be different in optical path length. An optical path difference OPD, $z_0=|z_1-z_2|$, may be created between the first light and the second light. The optical path difference OPD, $z_0=|z_1-z_2|$, may be about 30 μm to about 50 μm for the visible light range. The optical path difference OPD may be appropriately changed for other wavelength ranges. The optical path difference OPD may be about 10 μm to about 100 μm at a range including the near-ultraviolet, visible light, and near-infrared ranges. The polarizing splitter 41, or a non-polarizing beam splitter, may have no optical path difference.

In such cases, the polarization interferometer 40 may split the linearly polarized white light into a P-polarization wave and an S-polarization wave, and may modulate the P-polarization and S-polarization waves to have a phase difference, which may result in the generation of an output wave light $E_{out}$. For example, the polarization interferometer 40 may produce a spectral carrier frequency.

The line converter 61 may be disposed between the polarization interferometer 40 and a measured object OBJ, and may convert the output wave light $E_{out}$ to have a linear line-shape in a first direction D1 and provide the measured object OBJ with the line-shaped output wave light $E_{out}$. The line converter 61 may be, for example, a cylindrical lens elongated in the first direction D1. Alternatively, the line converter 61 may be a slit elongated in the first direction D1.

The output wave light $E_{out}$ coming out of the polarization interferometer 40 may be irradiated at a measurement angle θ deviated from a direction perpendicular to the measured object OBJ on the scanner 70. For example, the angle θ corresponds to an incident angle of the output wave light $E_{out}$. A measurement light $E_{mea}$ may be reflected at the measurement angle θ deviated from the direction perpendicular to the measured object OBJ.

The measured object OBJ may be loaded on the scanner 70, and the scanner 70 may be configured such that the measured object OBJ is transferred (scanned) in a second direction D2 intersecting the first direction D1. Preferably, the second direction D2 may be perpendicular to the first direction D1. Alternatively, the scanner 70 may be configured such that the measured object OBJ is scanned rotationally about an axis in a third direction D3 perpendicular to the first and second directions D1 and D2. For example, the third direction D3 may be perpendicular to the scanner 70.

The measured object OBJ may be, for example, a thin layer deposited on a silicon substrate. In this case, the phrase "the object OBJ is absent" may indicate a silicon substrate on which no thin layer is deposited.

The measured object OBJ may have polarization anisotropy. The polarization anisotropy of the measured object OBJ may provide amplitude modulation and phase modulation to the measurement light $E_{mea}$ coming out of the measured object OBJ. The second linear polarizer 80 may be provided with the measurement light $E_{mea}$ reflected from the measured object OBJ.

The second linear polarizer 80 may receive P- and S-polarization waves of the measurement light $E_{mea}$, and may linearly polarize the P- and S-polarization waves (e.g., with a rotation angle of 45°). Therefore, the P- and S-polarization waves interfere with each other to generate an interference light $E_{SP}$ that is polarization-modulated.

The imaging lens 62 may be disposed between the second linear polarizer 80 and the imaging spectrograph 90. The imaging lens 62 may be, for example, a cylindrical lens elongated in the first direction D1. The imaging lens 62 may thus convert the interference light $E_{SP}$ to a linear line-shape in the first direction D1. Alternatively, the imaging lens 62 may be an ordinary imaging lens.

The interference light $E_{SP}$ may be provided to the imaging spectrograph 90. The interference light $E_{SP}$ may vertically enter an incident surface of the imaging spectrograph 90. The interference light $E_{SP}$ imaged by the imaging lens 62 may have spectral information on the one-dimensional space along the first direction D1. The scanner 70 may drive the measured object OBJ to move in the second direction D2, and thus it may be possible to obtain spectral ellipsometric information (e.g., spectral ellipsometric cubic information) on two-dimensional spatial axes (e.g., the first and second directions D1 and D2) (see FIG. 6). The imaging spectrograph 90 may generate from the interference light $E_{SP}$ a spatio-spectral interference fringe that includes spatio-spectral ellipsometric information of the measured object OBJ. Even when the scanner 70 drives the measured object OBJ to rotate about an axis in the third direction D3, a similar result may be obtained.

In the present embodiment, a propagation direction of the output wave light $E_{out}$, a propagation direction of the measurement light $E_{mea}$, and the first direction D1 may be provided on the same plane.

In the embodiment mentioned above, the polarizing splitter 41 is a non-polarizing beam splitter, but the present inventive concepts are not limited thereto. The polarizing splitter 41 may be, for example, a polarizing beam splitter. In this case, the first sub-linear polarizer P1 and the second sub-linear polarizer P2 of FIG. 1 may be omitted. The polarizing splitter 41 may split the linearly polarized white light into a first light and a second light. The first light and the second light may be directed toward and reflected from the first mirror MR1 and the second mirror MR2, without passing through the first and second sub-linear polarizers P1 and P2.

The following will describe an extraction method in which the inspection apparatus of FIG. 1 is utilized to extract, from a spatio-spectral interference fringe, spatio-spectral ellipsometric information (spatio-spectral ellipsometric phase difference Δ(x,k) and spatio-spectral ellipsometric amplitude ratio Ψ(x,k)) of the measured object OBJ.

The input wave light $E_{in}$ incident on the polarization interferometer 40 may be expressed as follows.

$$E_{in}(x, k) = \begin{pmatrix} u(x, k)\exp[j\xi(x, k)] \\ v(x, k)\exp[j\eta(x, k)] \end{pmatrix}$$

Here, k is a wavenumber represented by $2\pi/\lambda$. The symbol λ refers to the wavelength of a light source. In the equation above, j is an operator which follows the rule $j^2 = -1$. The symbols u and v represent amplitudes of the input wave light for P-polarization and S-polarization, respectively. The symbols ξ and η denote phases of the input wave light for P-polarization and S-polarization, respectively. An x-direction indicates the first direction D1, or an extending direction of the line converter 61. A component in a moving direction of the scanner 70, or in a y-direction related to the second direction D2, is uniform and thus may be neglected.

The output wave light $E_{out}$ coming out of the polarization interferometer 40 is expressed as follows.

$$E_{out}(x,k) = E_1(x,k) + E_2(x,k)$$

In the equation above, $E_1(x, k)$ and $E_2(x, k)$ are respectively related to a P-polarization-modulated path and an S-polarization-modulated path. The terms $E_1(x, k)$ and $E_2(x, k)$ meet at an exit of the polarization interferometer 40, and may be represented as follows.

$$E_1(x, k) = J_{BS}J_{pol(0)}J_{M1}J_{pol(0)}J_{BS}J_{pol(45)}E_{in}(x, k)\exp[j2kz_1]$$
$$= \begin{pmatrix} u'(k)\exp[j(2kz_1 + \xi'(k))] \\ 0 \end{pmatrix}$$

And, $$E_2(x, k) = J_{BS}J_{pol(90)}J_{M2}J_{pol(90)}J_{BS}J_{pol(45)}E_{in}(x, k)\exp[j2kz_2]$$
$$= \begin{pmatrix} 0 \\ v'(k)\exp[j(2kz_2 + \eta'(k))] \end{pmatrix}$$

Here, $J_{pol(45)}$ denotes a Jones matrix of the first linear polarizer 30 oriented at a rotation angle of 45°. The term $J_{BS}$ is a Jones matrix of a non-polarizing beam splitter used as the polarizing splitter 41, and the terms $J_{pol(0)}$ and $J_{pol(90)}$ are Jones matrices of the first sub-linear polarizer P1 and the second sub-linear polarizer P2, respectively. The terms $J_{M1}$ and $J_{M2}$ represent Jones matrices of the first mirror MR1 and the second mirror MR2, respectively. The terms $z_1$ and $z_2$ denote optical path lengths along which the P- and S-polarization waves reciprocally travel between corresponding mirrors and corresponding reflective surfaces. It is assumed that the optical path difference OPD is absent in the polarizing splitter 41, or the non-polarizing beam splitter. Any other components of the one-piece polarization interferometer 40 are stably fixed and thus presumed to have the same optical path. The symbols u' and v' indicate newly defined unknown amplitude terms of $E_1(x, k)$ and $E_2(x, k)$, respectively. The symbols ξ' and η' indicate newly defined unknown amplitude terms of $E_1(x, k)$ and $E_2(x, k)$, respectively.

The output wave light $E_{out}$ is reflected from the anisotropic measured object OBJ shown in FIG. 1, and then changed into the measurement light $E_{mea}$. The polarization anisotropy of the measured object OBJ may provide amplitude modulation and phase modulation to the measurement light $E_{mea}$. The second linear polarizer 80 may be provided with the measurement light $E_{mea}$ reflected from the measured object OBJ. The second linear polarizer 80 may receive P- and S-polarization waves of the measurement light $E_{mea}$, and may linearly polarize the P- and S-polarization waves (e.g., with a rotation angle of 45°). Therefore, the P- and S-polarization waves interfere with each other to generate the interference light $E_{SP}$ that is polarization-modulated. The interference light $E_{SP}^{obj}$ from the measured object OBJ may be expressed as follows.

$$E_{SP}^{obj}(x,k) = E_{SP}^{1,obj}(z,k) + E_{SP}^{2,obj}(x,k)$$

Where, $$E_{SP}^{1,obj}(x,k) = u'(x,k)|r_P(x,k)|\exp[j(2kz_1 + \xi'(x,k) + \delta_P(x,k)]$$

$$E_{SP}^{2,obj}(x,k) = v'(x,k)|r_S(x,k)|\exp[j(2kz_2 + \eta'(x,k) + \delta_s(x,k)]$$

Here, $E_{SP}^{1,obj}$ and $E_{SP}^{2,obj}$ indicate interference light waves related to P-polarization and S-polarization, respectively. The symbols $|r_P|$ and $|r_S|$ represent amplitudes of complex Fresnel transmission coefficients for P-polarization and S-polarization, respectively, in a case of reflection from the measured object. The symbols $\delta_P$ and $\delta_S$ represent spatial phase changes for P-polarization and S-polarization, respectively, in a case of reflection from the measured object.

The optical path difference OPD at the one-piece polarization interferometer 40 according to the present inventive concepts generates a spectral carrier frequency required for extracting spatio-spectral ellipsometric information (e.g., spatio-spectral ellipsometric phase difference Δ(x, k) and spatio-spectral ellipsometric amplitude ratio Ψ(x, k)).

A spatio-spectrally interfered spectrum I(x, k) produced from the interference light $E_{SP}$ may be expressed as follows.

$$I(x,k) = (E_{SP}^1(x,k) + E_{SP}^2(x,k))(E_{SP}^1(x,k) + E_{SP}^2(x,k))$$

To perform calibration before obtaining spatio-spectral ellipsometric information of the measured object OBJ, an interfered reference spectrum $I^{ref}(x, k)$ is extracted from a silicon substrate, or a state in which the measured object OBJ is absent.

$$I^{ref}(x, k) = \left|E_{SP}^{1,ref}\right|^2 + \left|E_{SP}^{2,ref}\right|^2 + 2\gamma(x, k)\left|E_{SP}^{1,ref}\right|\left|E_{SP}^{2,ref}\right| \times \cos[\Phi^{ref}(x, k)]$$
$$= \alpha^2 + \beta^2 + 2\gamma(x, k)\alpha\beta \cos[\Phi^{ref}(x, k)]$$

where, $\Phi^{ref}(x, k) = 2kz_o + [\xi'(x, k) - \eta'(x, k)]$

In the equation above, γ(x, k) represents a spatio-spectral coherence function of the entire optical measurement system, and does not change regardless of the presence of the measured object. The term Φref(x, k) denotes a reference spatio-spectral phase function. The symbols α(x, k) and β(x, k) relate to absolute values of DC components of waves that travel along P- and S-polarization paths, respectively. That is, $\alpha(x, k)=|E_{SP}^{1,ref}|$, $\beta(x,k)=|E_{SP}^{2,ref}|$.

The spatio-spectral coherence function γ(x, k) and the reference spatio-spectral phase function Φref(x, k) may be obtained from the spatio-spectrally interfered reference spectrum $I^{ref}(x, k)$. To do this, it may be needed to change the interfered reference spectrum $I^{ref}(x, k)$ into $I_{mod}^{ref}(x, k)$.

$$I_{mod}^{ref}(x, k) = \frac{I^{ref}(x, k) - (\alpha^2 + \beta^2)}{2\alpha\beta}$$
$$= \gamma(x, k)\cos\Phi^{ref}(x, k)$$

The term $I_{mod}^{ref}(x, k)$ may undergo the Fourier transform in a spatio-spectral frequency domain, so that unwanted DC and AC components may be filtered out. The spatio-spectral coherence function γ(x, k) and the reference spatio-spectral phase function $\Phi^{ref}(x, k)$ are extracted from a result of the inverse Fourier transform on data where the DC and AC components are filtered out. The calibration step for obtaining $\Phi^{ref}(x, k)$ and γ(x, k) is required only once, and because $\Phi^{ref}(x, k)$ and γ(x, k) are fixed values inherent to an optical measurement system, $\Phi^{ref}(x, k)$ and γ(x, k) may be applied to Δ(x, k) and Ψ(x, k) of any measured object after the calibration step.

Figure 2A:
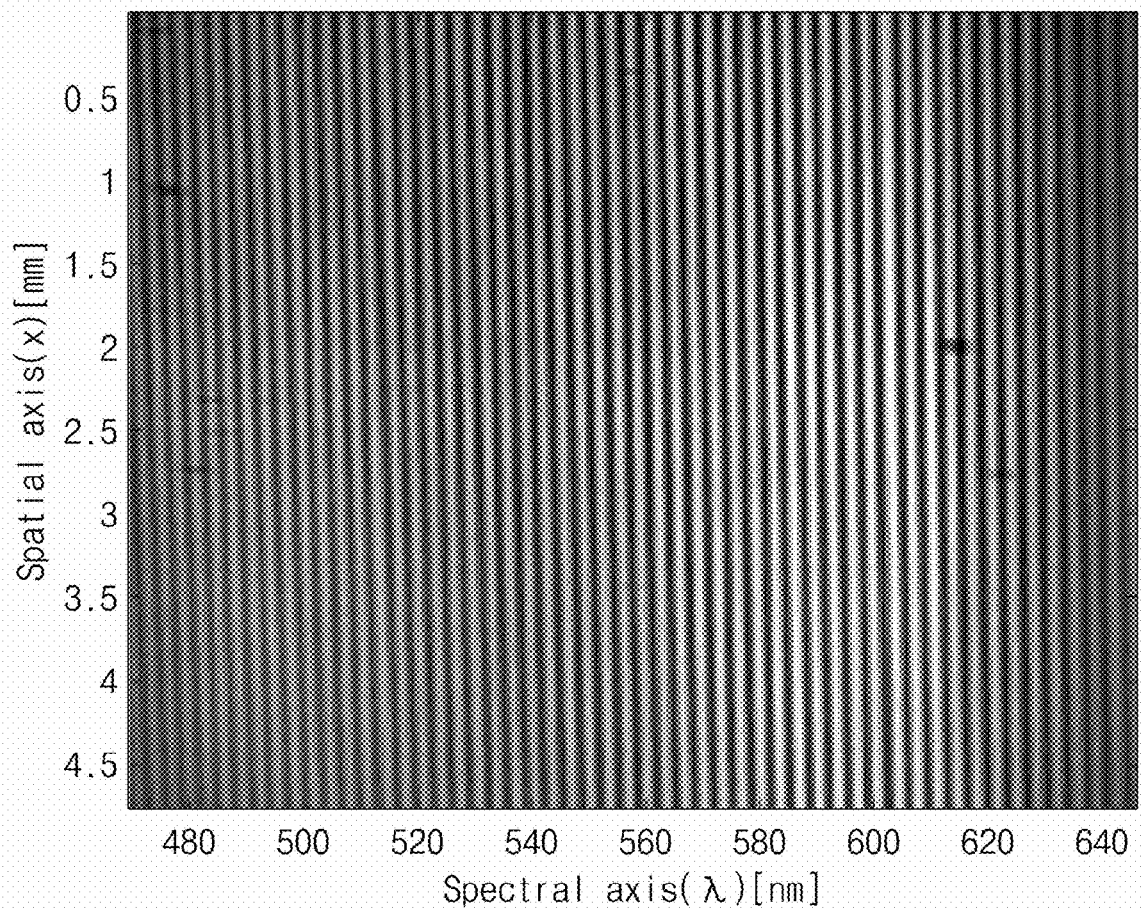
FIG. 2A illustrates an example of an interference fringe image measured in an imaging spectrograph according an example of the first embodiment of the present inventive concepts.
Figure 2B:
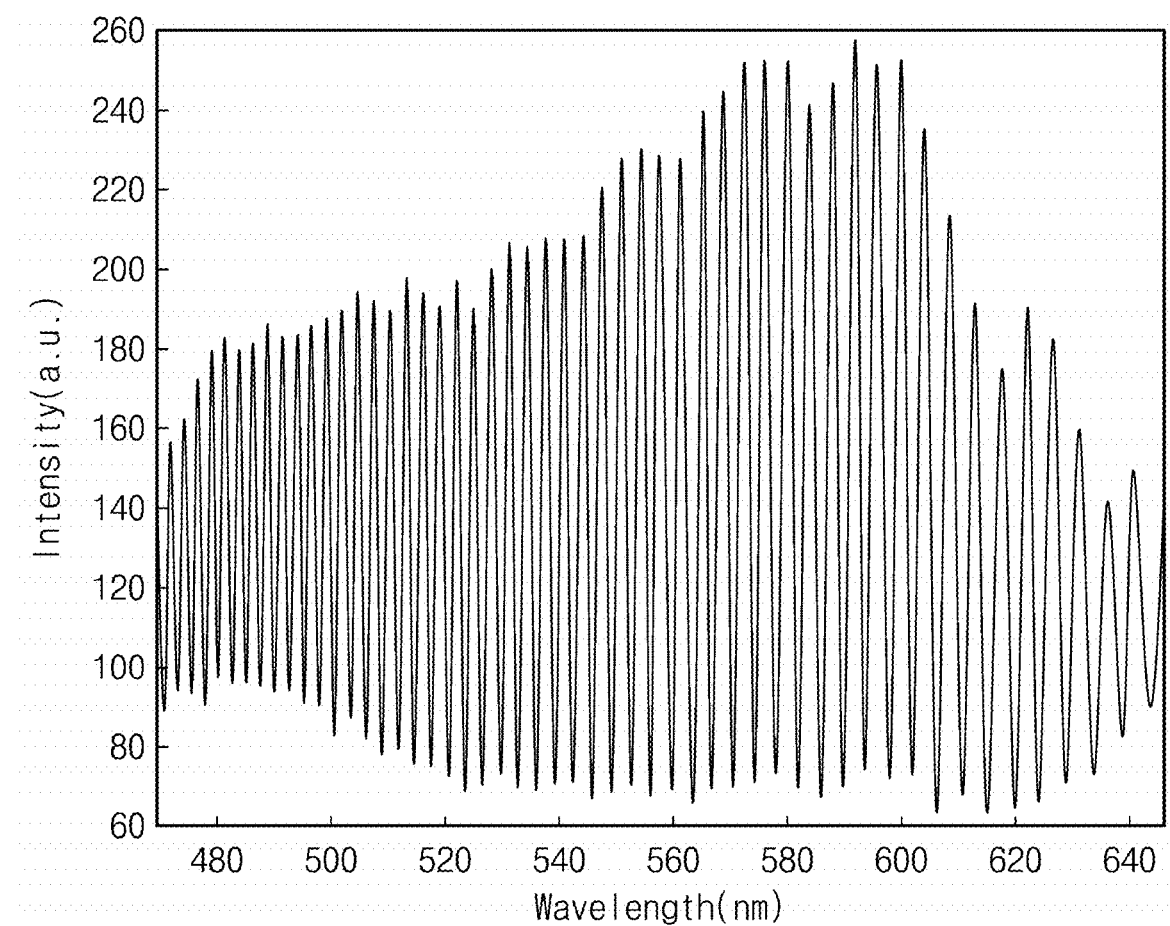
FIG. 2B illustrates a spectral interference signal with wavelength at one position on a spatial axis depicted in FIG. 2A.

When the output wave light $E_{out}$ is reflected from the measured object and then changed into the measurement light $E_{mea}$, an interfered spectrum $I^{obj}(x, k)$ is expressed as follows.

$$I^{obj}(x, k) = (|E_{SP}^{1,obj}||r_P(x, k)|)^2 + (|E_{SP}^{2,obj}||r_S(x, k)|)^2 +$$
$$2\gamma|E_{SP}^{1,obj}||E_{SP}^{2,obj}| \times |r_P||r_S(x, k)|\cos[\Phi^{obj}(x, k)]$$
$$= (\alpha|r_P(x, k)|)^2 + (\beta|r_S(x, k)|)^2 +$$
$$2\gamma\alpha\beta|r_P(x, k)||r_S(x, k)| \cos[\Phi^{obj}(x, k)]$$

where, $\Phi^{obj}(x, k) = 2kz_o + [\xi'(x, k) - \eta'(x, k)] + [\delta_P(x, k) - \delta_S(x, k)]$ FIG. 2A illustrates an example of the spatio-spectrally interfered spectrum $I^{obj}(x, k)$ of the measured object OBJ, which $I^{obj}(x, k)$ is measured in the imaging spectrograph 90 according to the first embodiment of the present inventive concept. The measured object OBJ was a silicon oxide layer (SiO$_2$) whose nominal thickness is 1.5 μm deposited on a silicon substrate. In FIG. 2A, the horizontal axis represents a spectral axis (λ), the vertical axis denotes a spatial axis (x) in the first direction D1, and brightness indicates spatio-spectral polarization-sensitive interference information. An interference fringe image is seen along the spectral axis (λ) and the spatial axis (x). FIG. 2B illustrates a spectral interference signal at wavelength λ at one position (e.g., x=2.79 mm) on the spatial axis of FIG. 2A.

The inspection apparatus according to the first embodiment of the present inventive concepts may use a spectral carrier frequency to obtain spectral ellipsometric information on the one-dimensional space (i.e., the first direction D1) of the measured object OBJ.

FIG. 3 illustrates an example of a spatio-spectral frequency image created when the interference fringe image of FIG. 2A is Fourier-transformed in the spatio-spectral frequency domain. In FIG. 3, the horizontal axis is a spectral frequency axis ($f_\lambda$), and the vertical axis a spatial frequency axis ($f_x$). The Fourier transform is performed in the spatio-spectral frequency domain, and thereafter, unwanted DC and AC components may be filtered out.

Afterwards, a spatio-spectral phase function $\Phi^{obj}(x, k)$ of the measured object may be extracted by performing a similar Fourier transform to that used for extracting the reference spatio-spectral phase function $\Phi^{ref}(x, k)$.

A spatio-spectral ellipsometric phase difference Δ(x, k) may be obtained as follows.

$$\Delta(x, k) = \Phi^{obj}(x, k) - \Phi^{ref}(x, k)$$
$$= \delta_P(x, k) - \delta_S(x, k)$$

Figure 4:
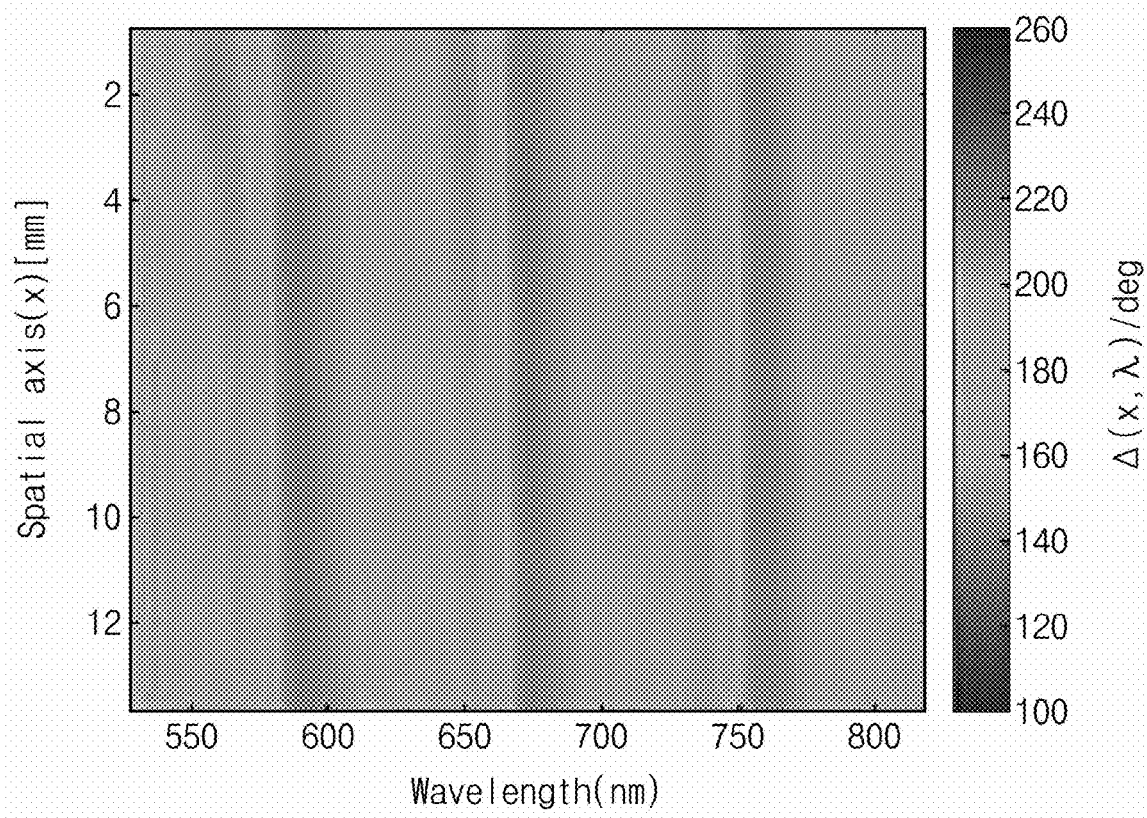
FIG. 4 illustrates an example of information about spectral ellipsometric phase differences on the one-dimensional space obtained by the inverse Fourier transform on the spatio-spectral frequency image depicted in FIG. 3.

FIG. 4 illustrates the spatio-spectral ellipsometric phase difference Δ(x, k) of the measured object. In FIG. 4, the horizontal axis represents a spectral axis λ, the vertical axis denotes a spatial axis x in the first direction D1, and brightness indicates the spatio-spectral ellipsometric phase difference Δ(x, k). The measured object OBJ was a silicon oxide layer (SiO$_2$) whose nominal thickness is 1.5 μm deposited on a silicon substrate.

Figure 5:
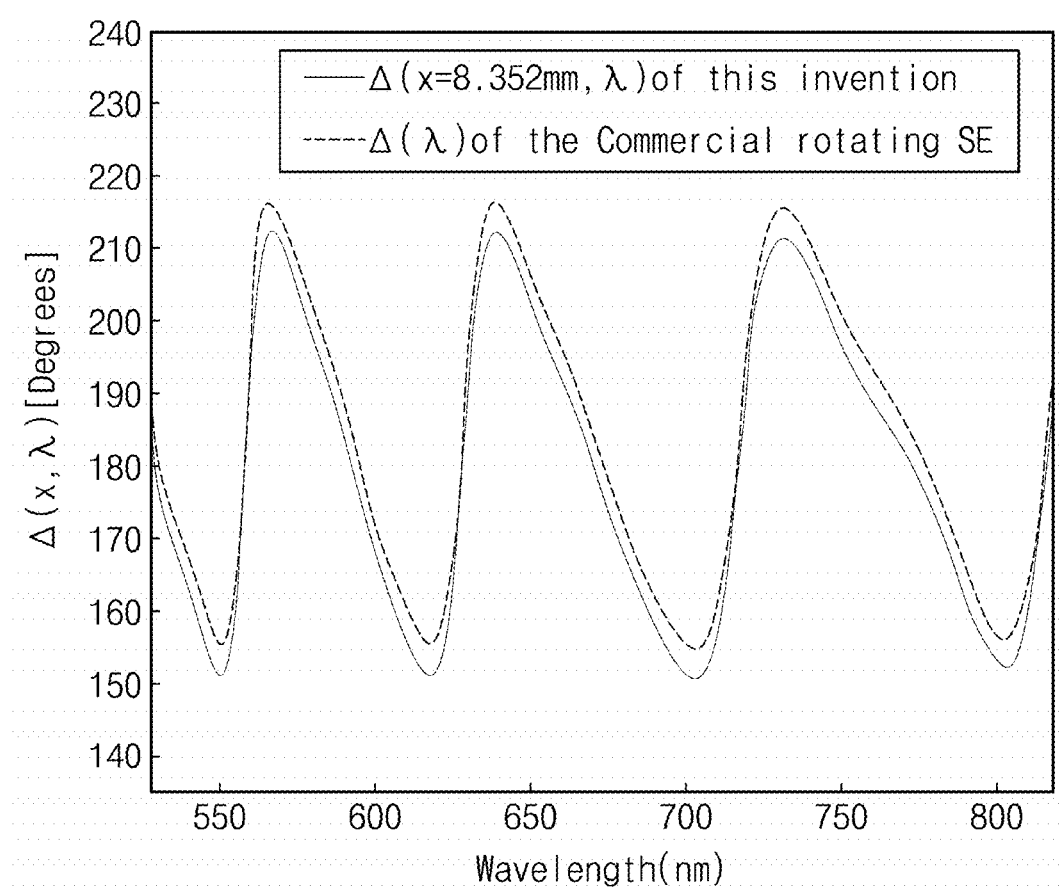
FIG. 5 illustrates a graph showing a comparison between spectral ellipsometric phase difference information for various wavelengths at x=8.353 measured by an inspection apparatus according to the present inventive concepts and those measured by a commercial apparatus.

FIG. 5 illustrates a comparison between the spatio-spectral ellipsometric phase difference Δ(x, k) measured with the inspection apparatus according to the present inventive concepts and Δ(k) for a specific point measured with a commercial tool (e.g., an spectroscopic ellipsometer available from J. A. Woollam Co.), which comparison shows almost the same result. The spectral ellipsometric phase difference Δ(k) shown in FIG. 5 is a result at the position of x=8.352 mm depicted in FIG. 4.

The spatio-spectral ellipsometric amplitude ratio Ψ(x, k) may be obtained in a similar way to that used to acquire the spatio-spectral ellipsometric phase difference Δ(x, k).

In a case of reflection from the anisotropic measured object, the interfered spectrum $I^{obj}(x, k)$ may be expressed as follows.

$$I^{obj}(x,k)=A_{obj}^{DC}+2\gamma(x,k)A_{obj}^{AC}\cos\Phi^{obj}(x,k)$$

Here, $A_{obj}^{DC}=(\alpha'|r_P|)^2+(\beta'|r_S|)^2$, $A_{obj}^{AC}=\alpha'\beta'|r_P||r_S|$, $\alpha'=|E_{SP}^{1,obj}|$, $\beta'=|E_{SP}^{2,obj}|$ Finally, $$\alpha'|t_P| = \frac{\sqrt{A_{obj}^{DC} + 2A_{obj}^{AC}} + \sqrt{A_{obj}^{DC} - 2A_{obj}^{AC}}}{2}$$

$$\beta'|t_S| = \frac{\sqrt{A_{obj}^{DC} + 2A_{obj}^{AC}} - \sqrt{A_{obj}^{DC} - 2A_{obj}^{AC}}}{2}$$

And, these terms $\alpha'|t_p|$ and $\beta'|t_s|$ may be used to obtain the spatio-spectral ellipsometric amplitude ratio Ψ(x, k) expressed below.

$$\Psi(x, k) = \tan^{-1}\left[\frac{|t_P|}{|t_S|}\right]$$
$$= \tan^{-1}\left[\frac{\beta'}{\alpha'} \cdot \frac{\sqrt{A_{obj}^{DC} + 2A_{obj}^{AC}} + \sqrt{A_{obj}^{DC} - 2A_{obj}^{AC}}}{\sqrt{A_{obj}^{DC} + 2A_{obj}^{AC}} - \sqrt{A_{obj}^{DC} - 2a_{obj}^{AC}}}\right]$$

Figure 6:
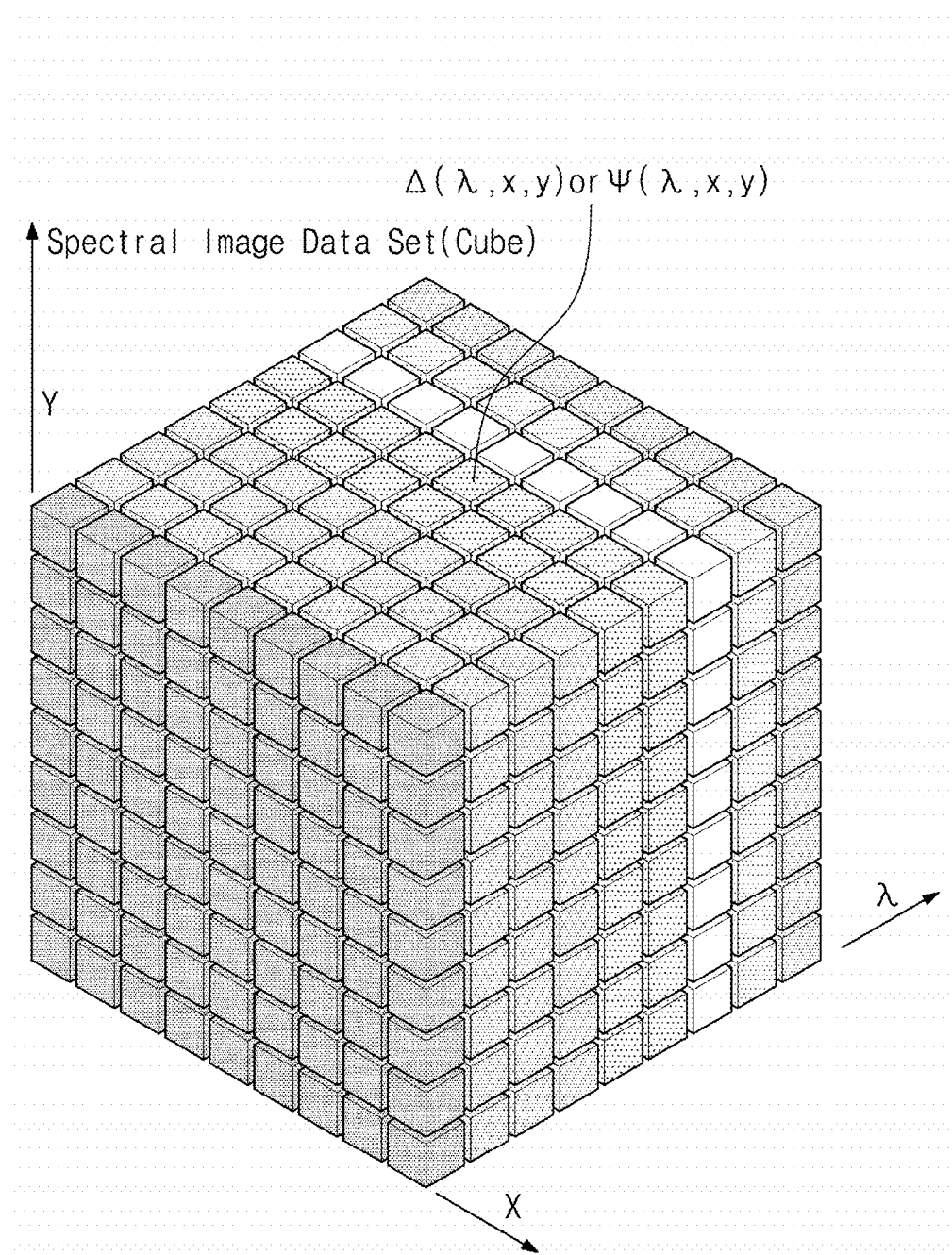
FIG. 6 illustrates spectral ellipsometric information measured in the form of cubic cells on the two-dimensional space according to the present inventive concepts.

The inspection apparatus according to the present inventive concepts may be configured such that spatio-spectral ellipsometric information of the measured object OBJ that moves in the second direction D2 are successively measured to obtain spatio-spectral ellipsometric information (e.g., spectral ellipsometric cubic information) along two-dimensional spatial axes (e.g., the first and second directions D1 and D2) (see FIG. 6).

Referring to FIG. 6, the bottom surface represents a spatial axis (i.e., x-axis) in the first direction D1 and a spectral axis (i.e., λ-axis), and the vertical axis denotes a spatial axis (i.e., y-axis) in the second direction D2. Brightness of each cubic cell expresses spatio-spectral ellipsometric information.

The inspection apparatus according to the present inventive concepts may provide an apparatus, without mechanically rotational mechanism or electronic signal modulation, which processes signals of three-dimensional spectral ellipsometric cubic data to detect microscopic defects on the two-dimensional space or to measure uniformity of nano-patterns or nano-films on the two-dimensional space.

Figure 7:
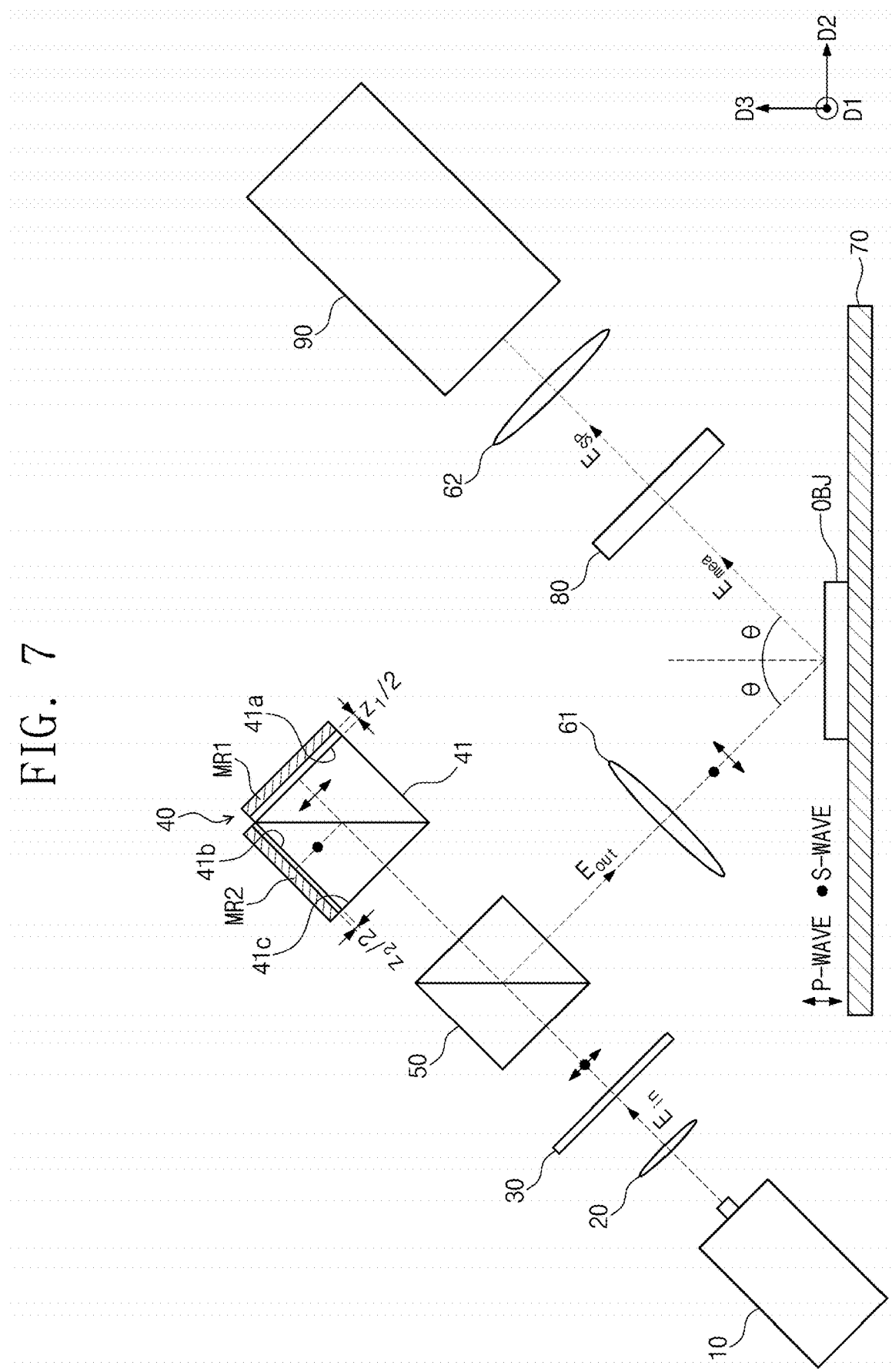
FIG. 7 illustrates a simplified schematic diagram showing an example of the inspection apparatus according to the first embodiment of the present inventive concepts.

FIG. 7 illustrates a simplified schematic diagram showing another example of the inspection apparatus according to the first embodiment of the present inventive concepts. Omission will be made to avoid duplicate explanation of components and functions discussed with reference to FIG. 1.

Referring to FIG. 7, a non-polarizing beam splitter 50 may further be included in an inspection apparatus according to an example of the first embodiment of the present inventive concepts. The non-polarizing beam splitter 50 may be disposed between the first linear polarizer 30 and the polarization interferometer 40. For example, the input wave light Ern linearly polarized (e.g., with a rotation angle of 45°) in the first linear polarizer 30 may be provided through the non-polarizing beam splitter 50 to the polarization interferometer 40.

The polarizing splitter 41 of the polarization interferometer 40 may be a polarizing beam splitter. Moreover, neither the first sub-linear polarizer P1 nor the second sub-linear polarizer P2 of FIG. 1 may be disposed. The polarizing splitter 41 may split the linearly polarized white light into a first light and a second light. The first light and the second light may be directed toward and reflected from the first mirror MR1 and the second mirror MR2, without passing through the first and second sub-linear polarizers P1 and P2.

The output wave light $E_{out}$ it is polarization-modulated in the polarization interferometer 40 may be provided through the non-polarizing beam splitter 50 and the line converter 61 to the measured object OBJ on the scanner 70. The output wave light $E_{out}$ coming out of the polarization interferometer 40 may be irradiated at a measurement angle θ deviated from a direction perpendicular to the measured object OBJ on the scanner 70. For example, the angle θ corresponds to an incident angle of the output wave light $E_{out}$. The measurement light $E_{mea}$ may be reflected at the measurement angle θ deviated from the direction perpendicular to the measured object OBJ.

The polarization anisotropy of the measured object OBJ may provide amplitude modulation and phase modulation to the measurement light $E_{mea}$ coming out of the measured object OBJ. The second linear polarizer 80 may be provided with the measurement light $E_{mea}$ reflected from the measured object OBJ, which may result in the creation of the interference light $E_{SP}$. The interference light $E_{SP}$ may be provided through the imaging lens 62 to the imaging spectrograph 90. The interference light $E_{SP}$ may vertically enter an incident surface of the imaging spectrograph 90. The imaging spectrograph 90 may generate, from the interference light $E_{SP}$, a spatio-spectral interference fringe that includes spatio-spectral ellipsometric information of the measured object OBJ.

Figure 8:
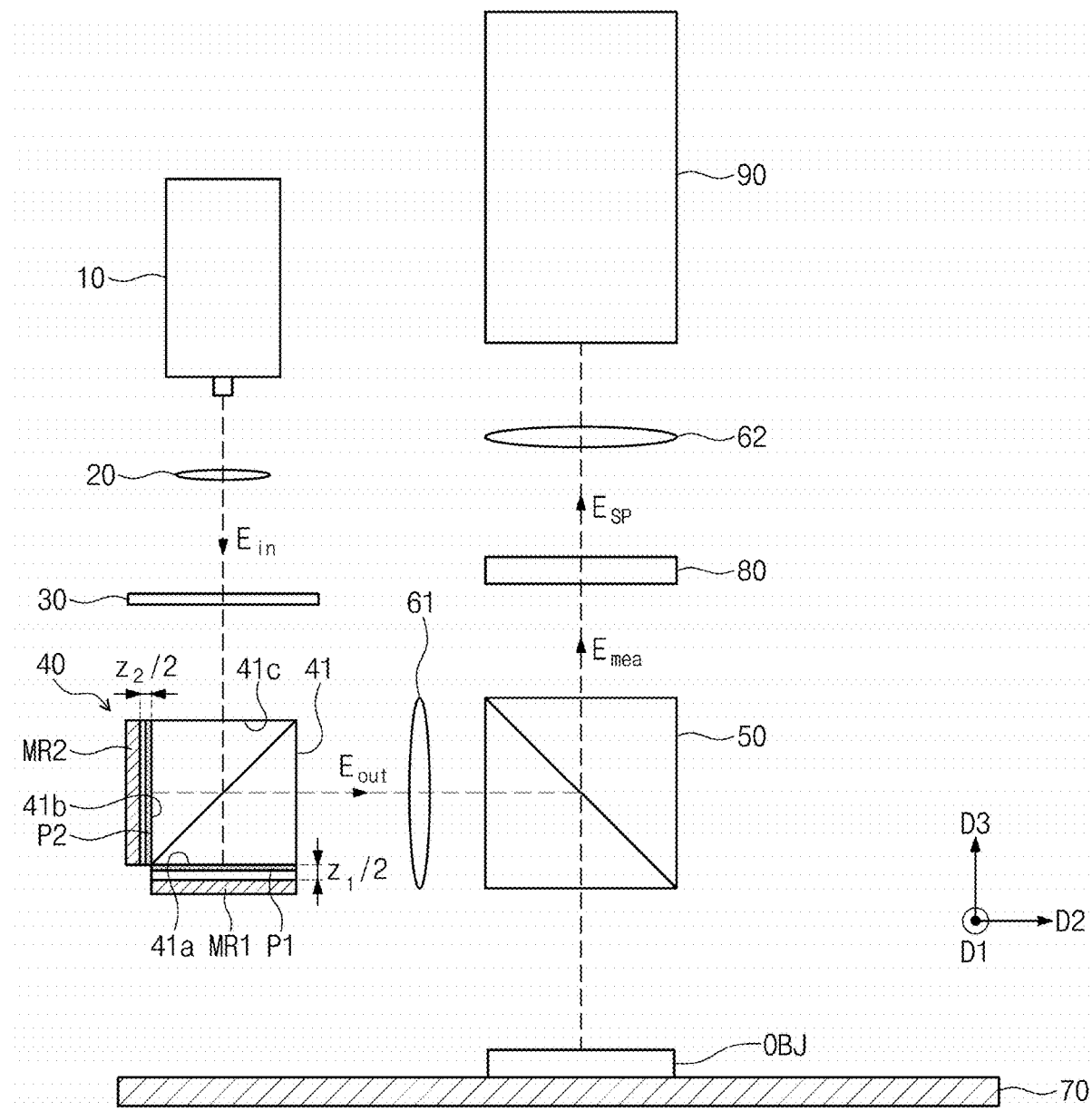
FIG. 8 illustrates a simplified schematic diagram showing an example of the inspection apparatus according to the first embodiment of the present inventive concepts.

FIG. 8 illustrates a simplified schematic diagram showing an example of the inspection apparatus according to the first embodiment of the present inventive concepts. Omission will be made to avoid duplicate explanation of components and functions discussed with reference to FIG. 1. Components in the present example may be spatially arranged differently from those shown in FIG. 1.

Referring to FIG. 8, a non-polarizing beam splitter 50 may further be included in an inspection apparatus according to an example of the first embodiment of the present inventive concepts. The non-polarizing beam splitter 50 may be disposed on one side of the polarization interferometer 40, and the line converter 61 may be placed between the polarization interferometer 40 and the non-polarizing beam splitter 50. The non-polarizing beam splitter 50 may provide the measured object OBJ with the output wave light $E_{out}$ coming out of the line converter 61.

The output wave light $E_{out}$ may be vertically irradiated to the measured object OBJ on the scanner 70, and the measurement light $E_{mea}$ may be vertically reflected from the measured object OBJ.

The measurement light $E_{mea}$ reflected from the measured object OBJ may reenter the non-polarizing beam splitter 50 and travel to the second linear polarizer 80.

Figure 9:
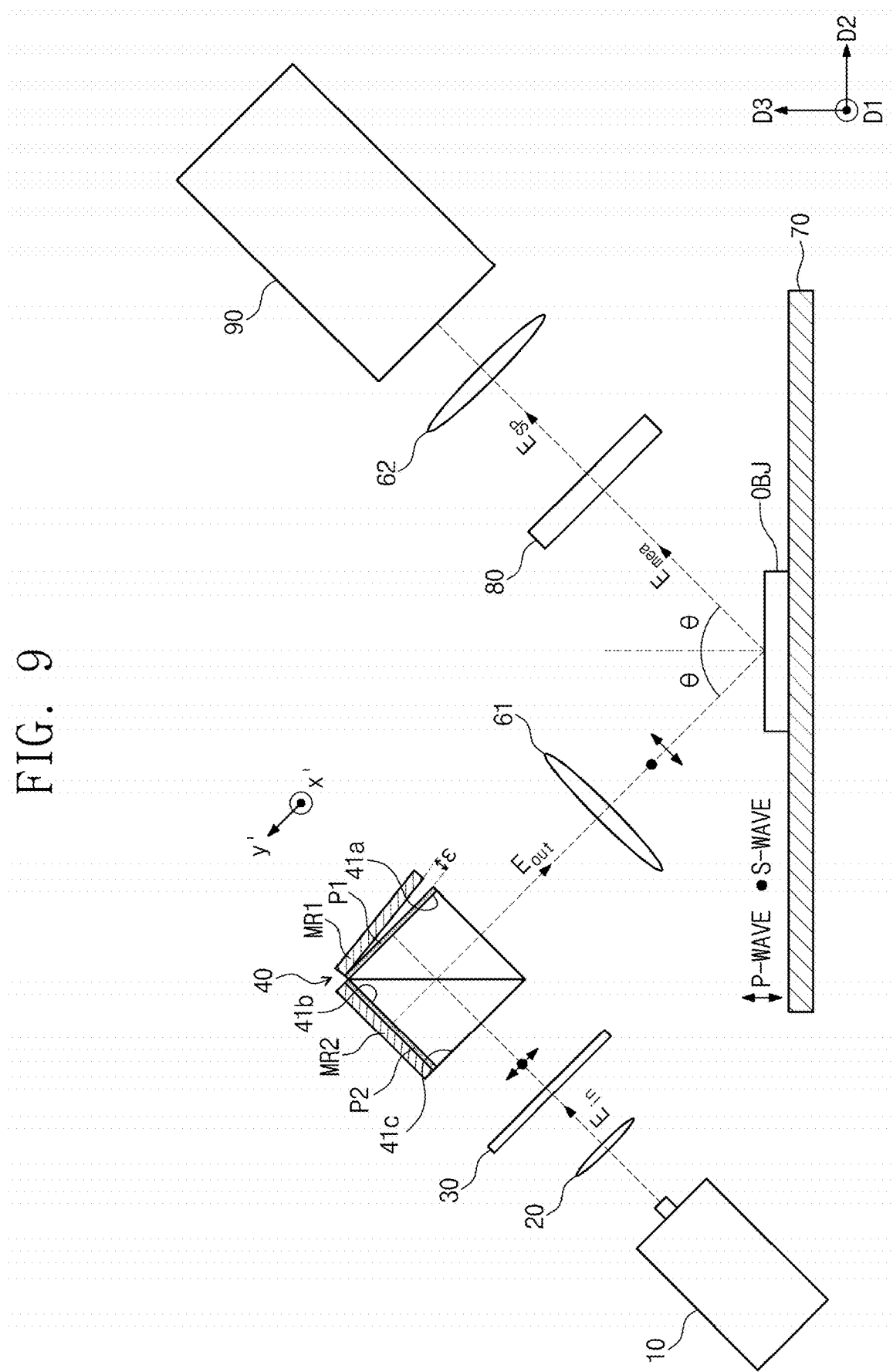
FIG. 9 illustrates a simplified schematic diagram showing an example of an inspection apparatus according to a second embodiment of the present inventive concepts.

FIG. 9 illustrates a simplified schematic diagram showing an example of an inspection apparatus according to a second embodiment of the present inventive concepts. Omission will be made to avoid duplicate components and functions discussed with reference to FIG. 1. In an inspection apparatus according to the present embodiment, the polarization interferometer 40 may be different from that discussed with reference to FIG. 1.

Referring to FIG. 9, the first and second mirrors MR1 and MR2 of the polarization interferometer 40 are not perpendicular to each other. For example, the first mirror MR1 and the second mirror MR2 may have an off-axis angle ε deviated from perpendicular. The off-axis angle ε may be about 0.01° to about 1°, preferably 0.02° to 0.1°. Because the first mirror MR1 is tilted at the off-axis angle ε, the polarization interferometer 40 may generate a high spatial carrier frequency to spatially modulate a polarization signal that is spatio-spectroscopically separated.

Therefore, the polarization interferometer 40 may split the linearly polarized white light into P- and S-polarization waves, and may allow the P- and S-polarization waves to have a spatial phase difference. For example, the polarization interferometer 40 may create a high spatial carrier frequency having a spatial phase shift.

Further, it may be possible to neglect the optical path difference OPD between the first light and the second light shown in FIG. 1.

The first light and the second light that are output from the polarization interferometer 40 may be provided through the line converter 61 to the measured object OBJ. The measured object OBJ may have polarization anisotropy. The polarization anisotropy may provide amplitude modulation and phase modulation to light coming out of the measured object OBJ. The second linear polarizer 80 may be provided with the measurement light $E_{mea}$ reflected from the measured object OBJ.

The second linear polarizer 80 may receive P- and S-polarization waves of the measurement light $E_{mea}$, and may linearly polarize the P- and S-polarization waves (e.g., with a rotation angle of 45°). Therefore, the P- and S-polarization waves interfere with each other to generate the interference light $E_{SP}$ that is polarization-modulated. The imaging spectrograph 90 may generate, from the interference light $E_{SP}$, a spatio-spectral interference fringe that includes spatio-spectral ellipsometric information of the measured object OBJ.

The interference light $E_{SP}$ may be provided through the imaging lens 62 to the imaging spectrograph 90. The imaging spectrograph 90 may produce a spatio-spectral interference fringe from the interference light $E_{SP}$.

In the embodiment mentioned previously, the polarizing splitter 41 is a non-polarizing beam splitter, but the present inventive concepts are not limited thereto. The polarizing splitter 41 may be, for example, a polarizing beam splitter. In this case, neither the first sub-linear polarizer P1 nor the second sub-linear polarizer P2 of FIG. 9 may be used. In this case, the polarizing splitter 41 may split a linearly polarized laser beam into a first light and a second light. The first light and the second light may be directed toward and reflected from the first mirror MR1 and the second mirror MR2, without passing through the first and second sub-linear polarizers P1 and P2.

The following will describe an extraction method in which the inspection apparatus of FIG. 9 is utilized to extract, from an interference fringe, spatio-spectral ellipsometric information (spatio-spectral ellipsometric phase difference $\Delta(x, k)$ and spatio-spectral ellipsometric amplitude ratio $\Psi(x, k)$) of the measured object OBJ.

The input wave light $E_{in}$ incident on the polarization interferometer 40 may be expressed as follows.

$$E_{in}(x', y', k) = \begin{pmatrix} E_x(x', y', k) \\ E_y(x', y', k) \end{pmatrix}$$

$$= \begin{pmatrix} u(x', y', k)\exp[j\xi(x', y', k)] \\ v(x', y', k)\exp[j\eta(x', y', k)] \end{pmatrix}$$

Here, k is a wavenumber represented by $2\pi/\lambda$. The symbol $\lambda$ refers to the wavelength of a light source. The symbol j is an operator which follows the rule $j^2=-1$. The symbols x'- and y'-axes represent axes on the polarization interferometer 40. The symbols u and v represent amplitudes of the incident wave light along the x'-axis and y'-axis, respectively. The symbols $\xi$ and $\eta$ denote phases of the incident wave light along the x'-axis and y'-axis, respectively. The P-polarization wave and S-polarization wave are oriented toward the x'-axis and the y'-axis, respectively.

The output wave light $E_{out}$ coming out of the polarization interferometer 40 is expressed as follows.

$$E_{out}(x',y',k)=E_1(x',y',k)+E_2(x',y',k)$$

Here, $E_1(x', y')$ and $E_2(x', y')$ are respectively related to a P-polarization path and an S-polarization path. The terms $E_1(x', y')$ and $E_2(x', y')$ meet at an exit of the polarization interferometer 40, and may be represented as follows.

$$E_1(x', y', k) = J_{BS}J_{pol(0)}J_{M1}J_{pol(0)}J_{BS}J_{pol(45)}E_{in}(x', y', k)$$
$$= \begin{pmatrix} u'(x', y', k)\exp[j(2k(k_{x1}x' + k_{y1}y') + \xi'(x', y', k))] \\ 0 \end{pmatrix}$$

And, $$E_2(x', y', k) = J_{BS}J_{pol(90)}J_{M2}J_{pol(90)}J_{BS}J_{pol(45)}E_{in}(x', y', k)$$
$$= \begin{pmatrix} 0 \\ v'(x', y', k)\exp[j(2k(k_{x2}x' + k_{y2}y') + \eta'(x', y', k))] \end{pmatrix}$$

Here, $J_{pol(45)}$ denotes a Jones matrix of the first linear polarizer 30 oriented at an rotation angle of 45°. The term $J_{BS}$ is a Jones matrix of a non-polarizing beam splitter used as the polarizing splitter 41, and the terms $J_{pol(0)}$ and $J_{pol(90)}$ are Jones matrices of the first sub-linear polarizer P1 and the second sub-linear polarizer P2, respectively. The terms $J_{M1}$ and $J_{M2}$ represent Jones matrices of the first mirror MR1 and the second mirror MR2, respectively. The symbols $k_{x1}$, $k_{y1}$, $k_{x2}$, and $k_{y2}$ are related to the off-axis angle $\epsilon$ of FIG. 9, the symbols $k_{x1}$ and $k_{y1}$ represent components of the wave vector traveled along the P-polarization paths of the polarization interferometer 40, and the symbols $k_{x2}$ and $k_{y2}$ denote components of the wave vector traveled along the S-polarization paths of the polarization interferometer 40.

The symbols u' and v' indicate newly defined unknown amplitude terms of $E_1(x', y')$ and $E_2(x', y')$, respectively. The symbols $\xi'$ and $\eta'$ indicate newly defined unknown amplitude terms of $E_1(x', y')$ and $E_2(x', y')$, respectively.

A spatial optical path difference in the polarization interferometer 40 may become a condition to generate spatial interference fringes. The line converter 61 may irradiate the output wave light $E_{out}$ having a linear line-shape in the first direction D1. Because the spatial interference fringe is significant only in the first direction D1 or an x-direction, the symbols $E_1(x', y', k)$ and $E_2(x', y', k)$ may be expressed as follows.

$$E_1(x', k) = J_{BS}J_{pol(0)}J_{M1}J_{pol(0)}J_{BS}J_{pol(45)}E_{in}(x', k)$$
$$= \begin{pmatrix} u'(x', k)\exp[j(2k(k_{x1}x') + \xi'(x', k))] \\ 0 \end{pmatrix}$$

And, $$E_2(x', k) = J_{BS}J_{pol(90)}J_{M2}J_{pol(90)}J_{BS}J_{pol(45)}E_{in}(x', k)$$
$$= \begin{pmatrix} 0 \\ v'(x', k)\exp[j(2k(k_{x2}x') + \eta'(x', k))] \end{pmatrix}$$

The output wave light $E_{out}$ is reflected from the anisotropic measured object OBJ shown in FIG. 9, and then changed into the measurement light $E_{mea}$. The polarization anisotropy of the measured object OBJ may provide amplitude modulation and phase modulation to the measurement light $E_{mea}$. The measurement light $E_{mea}$ may be expressed as follows.

$$E_{mea}^{obj}(x,k)=J_{obj}(x,k)E_{out}(x',k)$$

Here, the x-direction indicates the first direction D1, or an extending direction of the line converter 61. The equation above neglects a component in a moving direction of the scanner 70, or in a y-direction related to the second direction D2.

Here, $J_{obj}(x, k)$ represents a Jones matrix of the measured object OBJ.

$$J_{obj}(x, k) = \begin{pmatrix} |r_P(x, k)|\exp[j\delta_P(x, k)] & 0 \\ 0 & |r_S(x, k)|\exp[j\delta_S(x, k)] \end{pmatrix}$$

The symbols $|r_p|$ and $|r_s|$ represent amplitudes of complex Fresnel reflection coefficients for P-polarization and S-polarization, respectively, in a case of reflection from the measured object OBJ. The symbols $\delta_p$ and $\delta_s$ represent spatio-spectral phase changes for P-polarization and S-polarization, respectively, in a case of reflection from the measured object.

The second linear polarizer 80 may be provided with the measurement light $E_{mea}$ reflected from the measured object OBJ. The second linear polarizer 80 receives P- and S-polarization waves of the measurement light $E_{mea}$, and linearly polarizes the P- and S-polarization waves (e.g., with a rotation angle of 45°). Therefore, the P- and S-polarization waves may interfere with each other to generate the interference light $E_{SP}$ that is polarization-modulated. The interference light $E_{SP}^{obj}$ may be expressed as follows.

$$E_{SP}^{obj}(x,k) = E_{SP}^{1,obj}(x,k) + E_{SP}^{2,obj}(x,k)$$

Where, $$E_{SP}^{1,obj}(x,k) = u'(x,k)|r_P(x,k)|\exp[j(2k(k_{x1}x) + \xi'(x,k) + \delta_P(x,k)]$$

$$E_{SP}^{2,obj}(x,k) = v'(x,k)|r_S(x,k)|\exp[j(2k(k_{x2}x) + '(x,k) + \delta_S(x,k)]$$

Here, $E_{SP}^{1,obj}$ and $E_{SP}^{2,obj}$ indicate output light waves related to P-polarization and S-polarization, respectively.

An spatio-spectrally interfered spectrum I(x,k) resulting from the interference between the P-polarization wave and the S-polarization wave may be expressed as follows.

$$I(x,k) = (E_{SP}^{1,obj}(x,k) + E_{SP}^{2,obj}(x,k))(E_{SP}^{1,obj}(x,k) + E_{SP}^{2,obj}(x,k))^*$$

When the output wave light $E_{out}$ is reflected from an anisotropic measured object and is change into the measurement light $E_{mea}$, an interfered spectrum is $I^{obj}(x, k)$ expressed as follows.

$$I^{obj}(x,k) = \left(|E_{SP}^{1,obj}||r_P|\right)^2 + \left(|E_{SP}^{2,obj}||r_S|\right)^2 + 2\gamma |E_{SP}^{1,obj}||E_{SP}^{2,obj}| \times |r_P||r_S|\cos[\Phi^{obj}(x,k)]$$
$$= (\alpha|r_P(x,k)|)^2 + (\beta|r_S(x,k)|)^2 + 2\gamma\alpha\beta|r_P(x,k)||r_S(x,k)|\cos[\Phi^{obj}(x,k)]$$

Here, the terms α and β relate to absolute values of DC components of waves that travel along the P- and S-polarization paths, respectively. That is, $\alpha=|E_{SP}^{1,obj}|$, $\beta=|E_{SP}^{2,obj}|$. In the equation above, γ represents a spatio-spectral coherence function.

Figure 10:
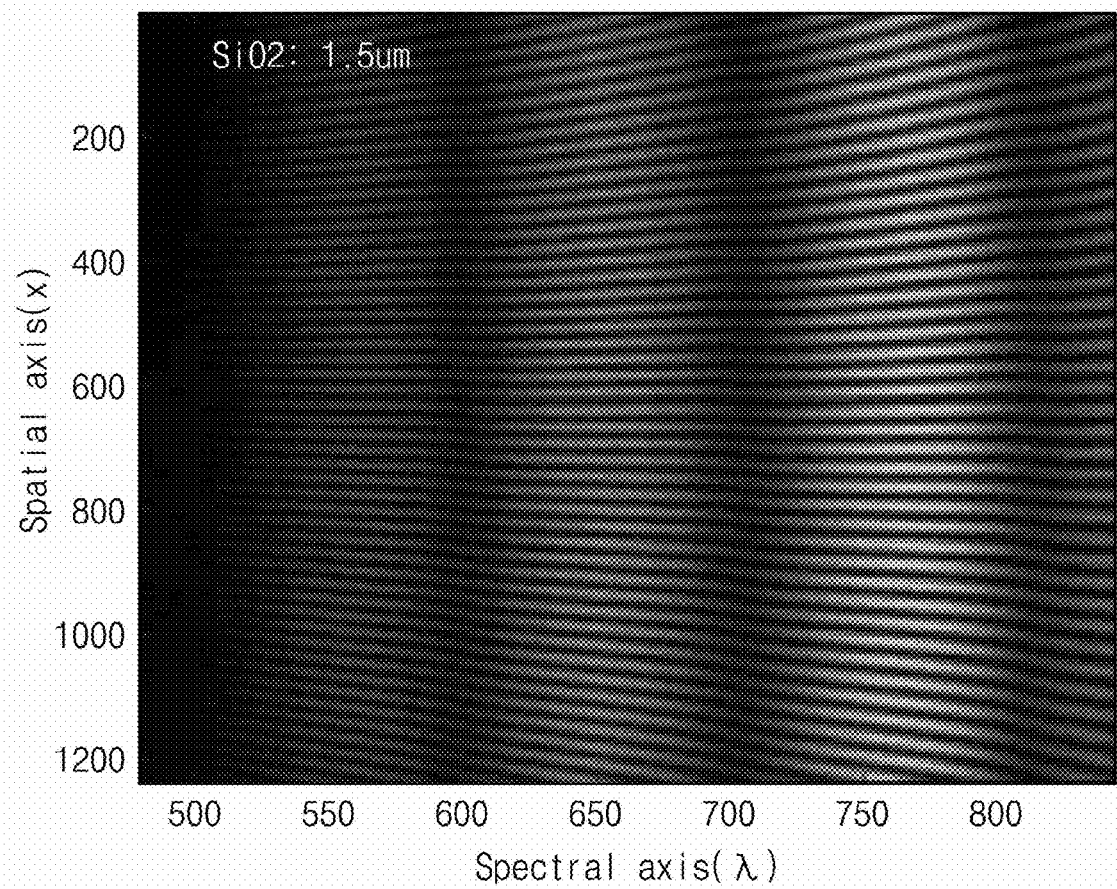
FIG. 10 illustrates an example of an interference fringe image measured in an imaging spectrograph according an example of the second embodiment of the present inventive concepts.

FIG. 10 illustrates an example of a spatio-spectral interfered spectrum $I^{obj}(x, k)$ on the one-dimensional space of the measured object OBJ, which $I^{obj}(x, k)$ is measured in the imaging spectrograph 90 according to the second embodiment of the present inventive concepts. The measured object OBJ was a silicon oxide layer (SiO$_2$) whose nominal thickness is 1.5 μm deposited on a silicon substrate. In FIG. 10, the horizontal axis represents a spectral axis (λ), the vertical axis denotes a spatial axis (x) in the first direction D1, and brightness indicates spatio-spectral interference information. An interference fringe image is seen along the spectral axis (λ) and the spatial axis (x). The interference fringe image is created along a direction of the spectral axis (λ) in FIG. 2A according to the first embodiment, whereas the interference fringe image is produced along a direction of the spatial axis (x) in FIG. 10 according to the second embodiment.

A spatio-spectral phase function $\Phi^{obj}(x, k)$ may be expressed as follows.

$$\Phi^{obj}(x,k) = 2kx(k_{x1}-k_{x2}) + [\xi'(x,k)-\eta'(x,k)] + [\delta_P(x,k)-\delta_S(x,k)]$$

To obtain the spatio-spectral phase function $\Phi^{obj}(x, k)$, a similar way to that of the first embodiment may be applied to perform the 2D Fourier transform in a spatio-spectral frequency domain. After the Fourier transform in the spatio-spectral frequency domain, unwanted DC and AC components may be filtered out. Afterwards, the spatio-spectral phase function $\Phi^{obj}(x, k)$ is extracted from a result of the inverse Fourier transform.

To measure a calibrated spatio-spectral ellipsometric phase difference Δ(x, k), it may be required to obtain a reference spatio-spectral phase function $\Phi^{ref}(x, k)$ when no measured object is present. The reference spatio-spectral phase function $\Phi^{ref}(x, k)$ may be acquired in a similar way to that of the first embodiment.

$$I^{ref}(x,k) = |E_{SP}^{1,ref}|^2 + |E_{SP}^{2,ref}|^2 + 2\gamma|E_{SP}^{1,ref}||E_{SP}^{2,ref}| \times \cos[\Phi^{ref}(x,k)]$$
$$= \alpha^2 + \beta^2 + 2\gamma(x,k)\alpha\beta\cos[\Phi^{obj}(x,k)]$$

Where, $$\Phi^{ref}(x,k) = 2kx(k_{x1}-k_{x2}) + [\xi'(x,k)-\eta'(x,k)]$$

In a similar way to that of the first embodiment, the 2D Fourier transform may be used to extract the reference spatio-spectral phase function $\Phi^{ref}(x, k)$.

It may be possible as described below to measure the spatio-spectral ellipsometric phase difference Δ(x, k) between P-polarization and S-polarization that are created by the anisotropic measured object.

$$\Delta(x,k) = \Phi^{obj}(x,k) - \Phi^{ref}(x,k)$$
$$= \delta_P(x,k) - \delta_S(x,k)$$

Figure 11:
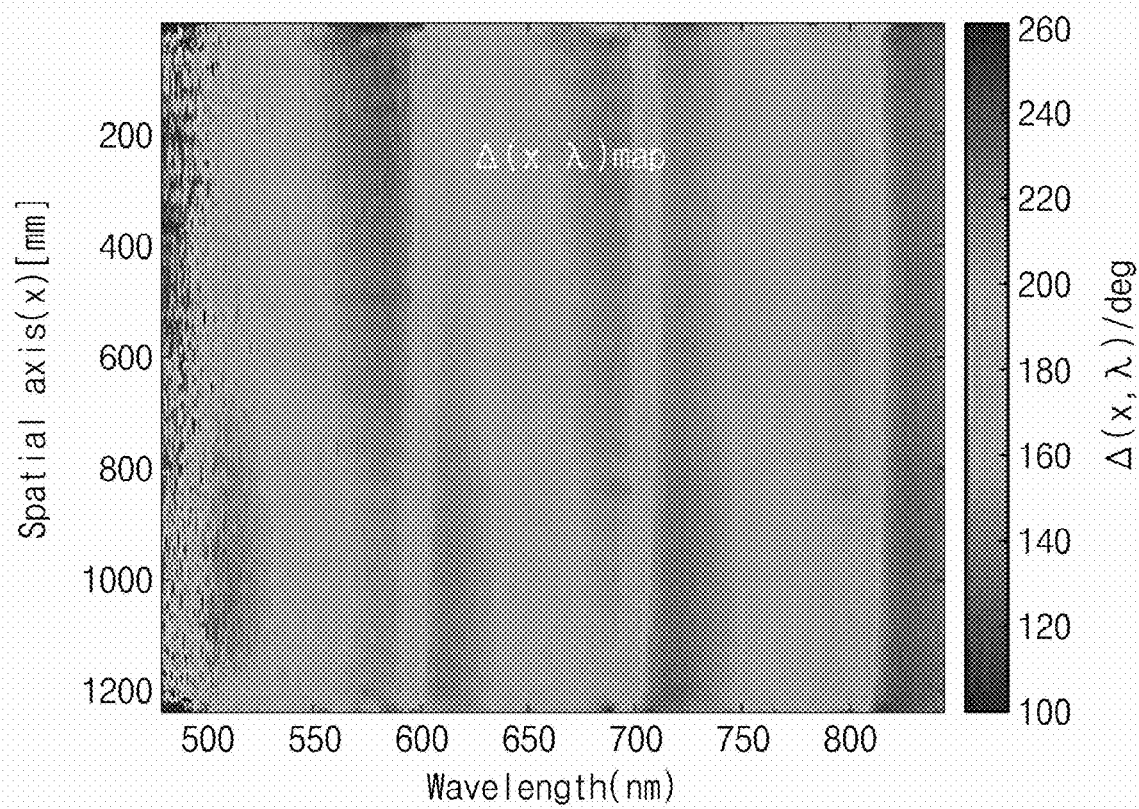
FIG. 11 illustrates an example of information about spectral ellipsometric phase differences on the one-dimensional space that are obtained from the interference fringe image of FIG. 10.

FIG. 11 illustrates the spatio-spectral ellipsometric phase difference Δ(x, k) of the measured object. In FIG. 11, the horizontal axis represents a spectral axis λ, the vertical axis denotes a spatial axis x in the first direction D1, and brightness indicates the spatio-spectral ellipsometric phase difference Δ(x, k). The measured object OBJ was a silicon oxide layer (SiO$_2$) whose nominal thickness is 1.5 μm deposited on a silicon substrate.

A similar way to that of the first embodiment may obtain a spatio-spectral ellipsometric amplitude ratio Ψ(x, k) between P-polarization and S-polarization.

As discussed above, the inspection apparatus according to an example of the second embodiment of the present inventive concepts may be configured similarly to the first embodiment, such that spatio-spectral ellipsometric information on the one-dimensional space of the measured object OBJ that moves in the second direction D2 are successively measured to obtain spatio-spectral ellipsometric information (e.g., spectral ellipsometric cubic information) along two-dimensional spatial axes (e.g., the first and second directions D1 and D2) (see FIG. 6).

Figure 12:
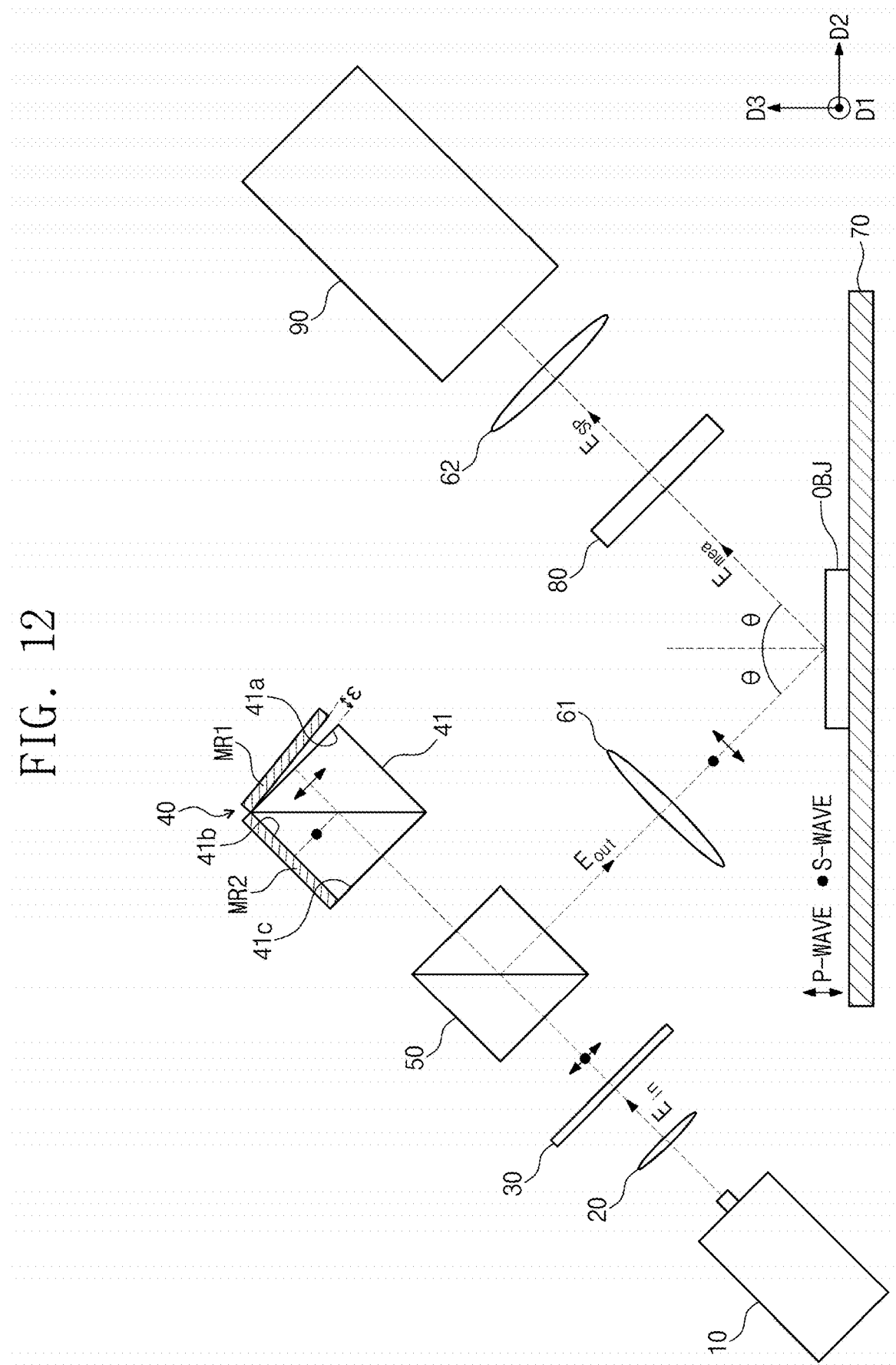
FIG. 12 illustrates a simplified schematic diagram showing an example of the inspection apparatus according to the second embodiment of the present inventive concepts.

FIG. 12 illustrates a simplified schematic diagram showing an example of the inspection apparatus according to the second embodiment of the present inventive concepts. Omission will be made to avoid duplicate explanation of components and functions discussed with reference to FIG. 9.

Referring to FIG. 12, a non-polarizing beam splitter 50 may further be included in an inspection apparatus according to an example of the second embodiment of the present inventive concepts. The non-polarizing beam splitter 50 may be disposed between the first linear polarizer 30 and the polarization interferometer 40. For example, the input wave light $E_{in}$ linearly polarized (e.g., with a rotation angle of 45°) in the first linear polarizer 30 may be provided through the non-polarizing beam splitter 50 to the polarization interferometer 40.

As shown in FIG. 12, the polarizing splitter 41, the first mirror MR1, and the second mirror MR2 of the polarization interferometer 40 may be configured similarly to those illustrated in FIG. 9. For example, the first mirror MR1 and the second mirror MR2 may have an off-axis angle ε deviated from perpendicular. The polarization interferometer 40 may split the linearly polarized white light into P- and S-polarization waves, and may allow the P- and S-polarization waves to have a spatial phase difference. For example, the polarization interferometer 40 may create a high spatial carrier frequency having a spatial phase shift.

The polarizing splitter 41 of the polarization interferometer 40 may be a polarizing beam splitter. Moreover, the first sub-linear polarizer P1 and the second sub-linear polarizer P2 of FIG. 9 may be omitted. The polarizing splitter 41 may split the linearly polarized white light into a first light and a second light. The first light and the second light may be directed toward and reflected from the first mirror MR1 and the second mirror MR2, without passing through the first and second sub-linear polarizers P1 and P2 of FIG. 9.

The output wave light $E_{out}$ that is polarization-modulated in the polarization interferometer 40 may be provided through the non-polarizing beam splitter 50 to the measured object OBJ on the scanner 70. The output wave light $E_{out}$ that is polarization-modulated in the polarization interferometer 40 may be provided through the non-polarizing beam splitter 50 and the line converter 61 to the measured object OBJ on the scanner 70. The output wave light $E_{out}$ coming out of the polarization interferometer 40 may be irradiated at a measurement angle θ deviated from a direction perpendicular to the measured object OBJ on the scanner 70, and the measurement light $E_{mea}$ may be reflected at the measurement angle θ deviated from the direction perpendicular to the measured object OBJ.

The polarization anisotropy of the measured object OBJ may provide amplitude modulation and phase modulation to the measurement light $E_{mea}$ coming out of the measured object OBJ. The second linear polarizer 80 may be provided with the measurement light $E_{mea}$ reflected from the measured object OBJ. The interference light $E_{SP}$ may be provided through the imaging lens 62 to the imaging spectrograph 90. The interference light $E_{SP}$ may vertically enter an incident surface of the imaging spectrograph 90. The imaging spectrograph 90 may generate from the interference light $E_{SP}$ a spatio-spectral interference fringe that includes spatio-spectral ellipsometric information of the measured object OBJ.

Figure 13:
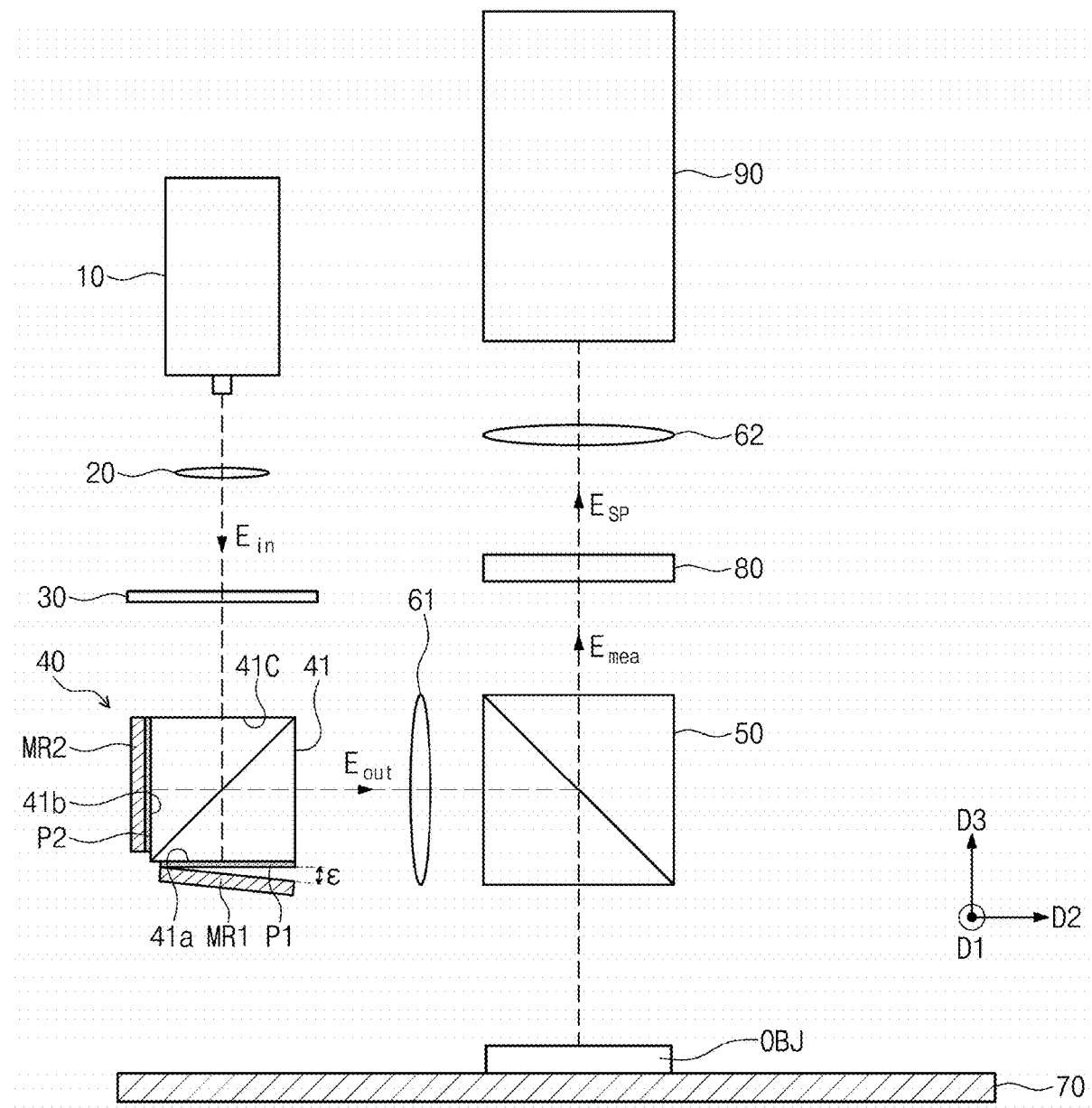
FIG. 13 illustrates a simplified schematic diagram showing an example of the inspection apparatus according to the second embodiment of the present inventive concepts.

FIG. 13 illustrates a simplified schematic diagram showing a still another example of the inspection apparatus according to the second embodiment of the present inventive concepts. Omission will be made to avoid duplicate explanation of components and functions discussed with reference to FIG. 9. Components in the present example may be spatially arranged differently from those shown in FIG. 9.

Referring to FIG. 13, a non-polarizing beam splitter 50 may further be included in an inspection apparatus according to still another example of the second embodiment of the present inventive concepts. The non-polarizing beam splitter 50 may be disposed on one side of the polarization interferometer 40, and the line converter 61 may be placed between the polarization interferometer 40 and the non-polarizing beam splitter 50. The non-polarizing beam splitter 50 may provide the measured object OBJ with the output wave light $E_{out}$ coming out of the line converter 61.

The output wave light $E_{out}$ may be vertically irradiated to the measured object OBJ on the scanner 70, and the measurement light $E_{mea}$ may be vertically reflected from the measured object OBJ.

The measurement light $E_{mea}$ reflected from the measured object OBJ may reenter the non-polarizing beam splitter 50 and travel to the second linear polarizer 80.

According to the present inventive concepts, without mechanically rotational mechanism and electronic signal modulation, spatio-spectral ellipsometric information on the one-dimensional space of a measured object may be successively measured to obtain spatio-spectral ellipsometric information (e.g., spectral ellipsometric cubic information) along two-dimensional spatial axes. The spectral ellipsometric information may be used to measure uniformity of nano-patterns or nano-films on the two-dimensional space or to detect microscopic defects at high speed (several hundred times compared to the prior art) on the two-dimensional space.

Although the embodiments have been described with reference to a number of illustrative examples thereof, it will be understood by those of ordinary skill in the art that various changes in form and details may be made without departing from the spirit and scope of the present inventive concepts as set forth in the following claims. Thus, the technical scope of the present inventive concepts is not limited by the embodiments and examples described above, but by the following claims.

What is claimed is:

1. An inspection apparatus, comprising:
    a light generator that generates light;
    a first linear polarizer that linearly polarizes the light;
        a polarization interferometer that splits the linearly polarized light into a first light and a second light and that modulates the first light and the second light to have phase difference information;
    a line converter that converts an output wave light to have a linear line-shape in a first direction and that provides a measured object with the line-shaped output wave light, the output wave light coming out of the polarization interferometer;
    a scanner that loads the measured object, the scanner being configured such that the measured object is scanned in a second direction intersecting the first direction or is scanned rotationally about an axis in a third direction perpendicular to the first and second directions;
    a second linear polarizer that receives a measurement light and linearly polarizes the first light and the second light of the measurement light to generate an interference light, the measurement light coming from the output wave light that passes through or reflects from the measured object; and
    an imaging spectrograph that receives the interference light to obtain an image of the measured object,
    wherein the, polarization interferometer includes:
    a beam that splits the linearly polarized light into the first light and the second light, the beam splitter including an incident surface on which the linearly polarized light is incident,
        a first reflective surface on which the first light is incident,
        a second reflective surface on which the second light is incident, wherein the first reflective surface faces the incident surface, and wherein the first and second reflective surfaces are adjacent to each other;

a first mirror on the first reflective surface; and a second mirror on the second reflective surface, wherein an angle between the first mirror and the second mirror is deviated from perpendicular, and wherein the light generated from the light generator is a white light.

2. The inspection apparatus of claim 1, wherein the line converter is a cylindrical lens elongated in the first direction.

3. The inspection apparatus of claim 1, further comprising an imaging lens that converts the interference light to have a linear line-shape in the first direction and that provides the imaging spectrograph with the line-shaped interference light.

4. The inspection apparatus of claim 1, wherein the first direction and the second direction are perpendicular to each other.

5. The inspection apparatus of claim 1, wherein a length of an optical path along which the first light reciprocally travels between the first reflective surface and the first mirror is different from a length of an optical path along which the second light reciprocally travels between the second reflective surface and the second mirror.

6. The inspection apparatus of claim 5, wherein a difference in the optical path between the first light and the second light is 10 μm to 100 μm.

7. The inspection apparatus of claim 1, wherein the deviation angle ranges from 0.02° to 0.1°.

8. The inspection apparatus of claim 1, wherein the output wave light is irradiated at a measurement angle deviated from a direction perpendicular to the measured object, and the measurement light is reflected at the measurement angle deviated from the direction perpendicular to the measured object.

9. The inspection apparatus of claim 8, wherein the beam splitter of the polarization interferometer is a non-polarizing beam splitter, and the polarization interferometer further includes:

a first sub-linear polarizer between the first reflective surface and the first mirror of the beam splitter; and a second sub-linear polarizer between the second reflective surface and the second mirror of the beam splitter, wherein the first sub-linear polarizer and the second sub-linear polarizer have a polarization difference of as much as 90°.

10. The inspection apparatus of claim 9, wherein the line converter is disposed between the polarization interferometer and the measured object.

11. The inspection apparatus of claim 8, wherein the beam splitter of the polarization interferometer is a polarizing beam splitter, and the inspection apparatus further comprises a non-polarizing beam splitter between the first linear polarizer and the polarization interferometer, the non-polarizing beam splitter providing the polarization interferometer with the linearly polarized light and providing the measured object with the output wave light.

12. The inspection apparatus of claim 11, wherein the line converter is disposed between the non-polarizing beam splitter and the measured object.

13. The inspection apparatus of claim 1, wherein the output wave light is vertically incident on the measured object, and the measurement light is vertically reflected from the measured object.

14. The inspection apparatus of claim 13, further comprising a non-polarizing beam splitter that is adjacent to the polarization interferometer and provides the measured object with the output wave light.

15. The inspection apparatus of claim 14, wherein the line converter is disposed between the polarization interferometer and the non-polarizing beam splitter.

16. The inspection apparatus of claim 15, wherein the output wave light is provided through the line converter and the non-polarizing beam splitter to the measured object, and the measurement light is provided through the non-polarizing beam splitter to the second linear polarizer.

17. The inspection apparatus of claim 1, wherein the first light and the second light are a P-polarization wave and an S-polarization wave, respectively.

* * * * *